(12) United States Patent
Hamell et al.

(10) Patent No.: US 10,383,323 B2
(45) Date of Patent: Aug. 20, 2019

(54) KNOTTING AID

(71) Applicants: Michael Jon Hamell, Omaha, NE (US); Eric David Coffey, The Colony, TX (US); Robert Shawn Hamell, Southlake, TX (US)

(72) Inventors: Michael Jon Hamell, Omaha, NE (US); Eric David Coffey, The Colony, TX (US); Robert Shawn Hamell, Southlake, TX (US)

(*) Notice: Subject to any disclaimer, the term of this patent is extended or adjusted under 35 U.S.C. 154(b) by 26 days.

(21) Appl. No.: 15/594,477

(22) Filed: May 12, 2017

(65) Prior Publication Data

US 2018/0064085 A1 Mar. 8, 2018

Related U.S. Application Data

(60) Provisional application No. 62/335,486, filed on May 12, 2016.

(51) Int. Cl.
*A01K 97/00* (2006.01)
*A01K 97/06* (2006.01)
*D04G 5/00* (2006.01)

(52) U.S. Cl.
CPC .............. *A01K 97/00* (2013.01); *A01K 97/06* (2013.01); *D04G 5/00* (2013.01)

(58) Field of Classification Search
CPC .......... D04G 5/00; A01K 83/00; A01K 97/00; A01K 97/06; A01K 97/26; A01K 97/28; A01K 85/08; A01K 91/04; A01K 91/047; A01K 91/08; F16B 2/06; F16B 2/065; F16M 13/022; B65H 69/04; D03J 3/00
See application file for complete search history.

(56) References Cited

U.S. PATENT DOCUMENTS

| | | | | |
|---|---|---|---|---|
| 2,469,037 A * | 5/1949 | Harvey | ................. | A01K 91/04 289/1.5 |
| 2,498,920 A * | 2/1950 | Holland | ................. | A01K 91/04 289/17 |
| 4,613,173 A * | 9/1986 | Rosser | ................. | A01K 91/04 289/17 |
| 5,240,295 A * | 8/1993 | Spencer | ................. | B65H 69/04 289/1.5 |
| 5,690,370 A * | 11/1997 | Steck, III | ............. | A01K 91/047 289/17 |
| 5,785,304 A * | 7/1998 | Little | ..................... | A01K 97/28 269/16 |
| 6,065,595 A * | 5/2000 | Ratcliff | ................. | A01K 97/06 206/315.11 |
| 6,485,307 B1 * | 11/2002 | Mestyanek | ............ | G09B 19/24 434/258 |
| 7,568,738 B1 * | 8/2009 | Snoop | .................... | A01K 97/28 289/17 |
| 9,474,259 B2 * | 10/2016 | Banda | .................... | A01K 91/04 |

* cited by examiner

*Primary Examiner* — Ismael Izaguirre
(74) *Attorney, Agent, or Firm* — Ferguson Braswell Fraser Kubasta PC; Elizabeth Philip Dahm; Kelly Kubasta

(57) ABSTRACT

In various implementations, a knotting aid may facilitate hand tying of line(s). A knotting aid may include two or more arms extending from a base. A first arm of the knotting aid may include a stationary coupling member and a second arm of the knotting aid may include a sliding coupling member. The coupling members may be able to retain line(s) without substantially damaging the line(s).

21 Claims, 22 Drawing Sheets

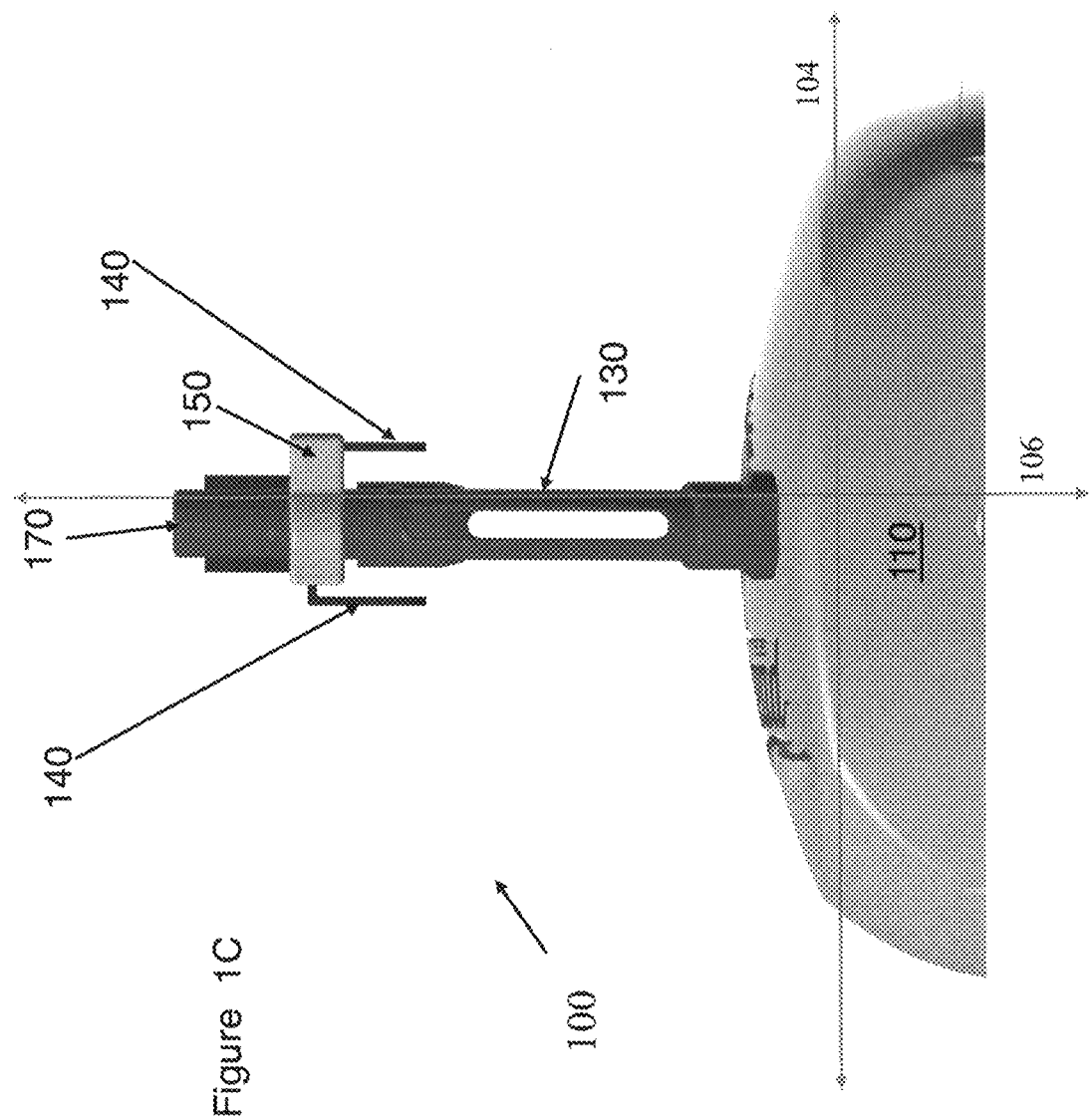

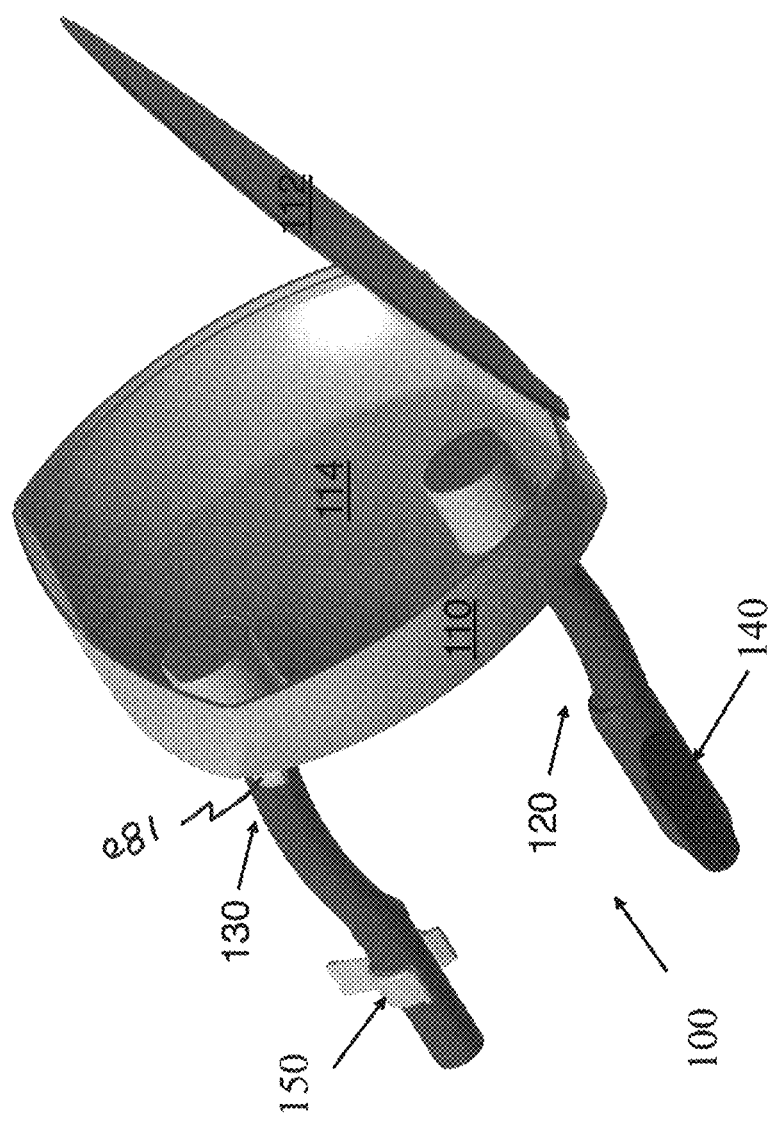

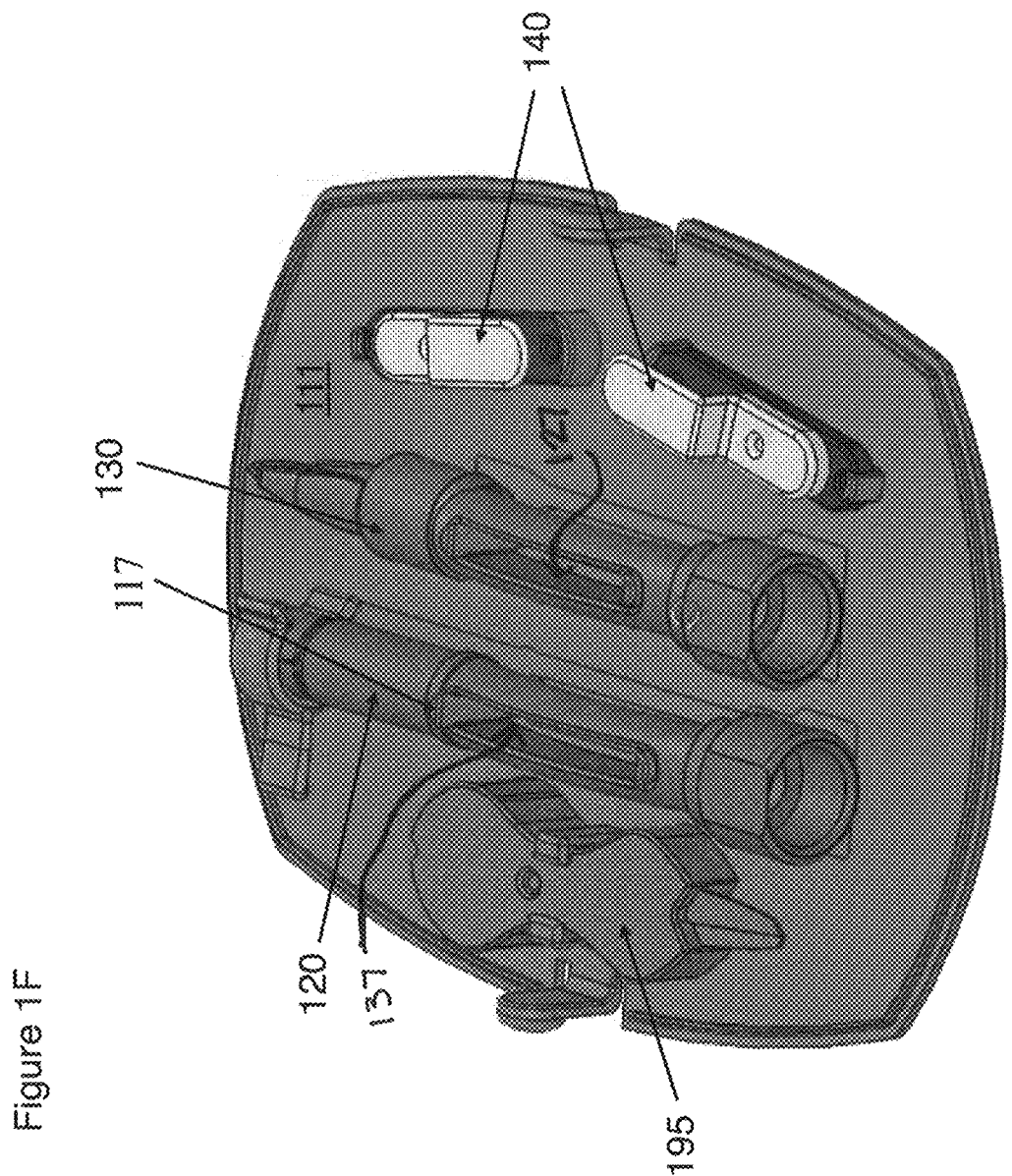

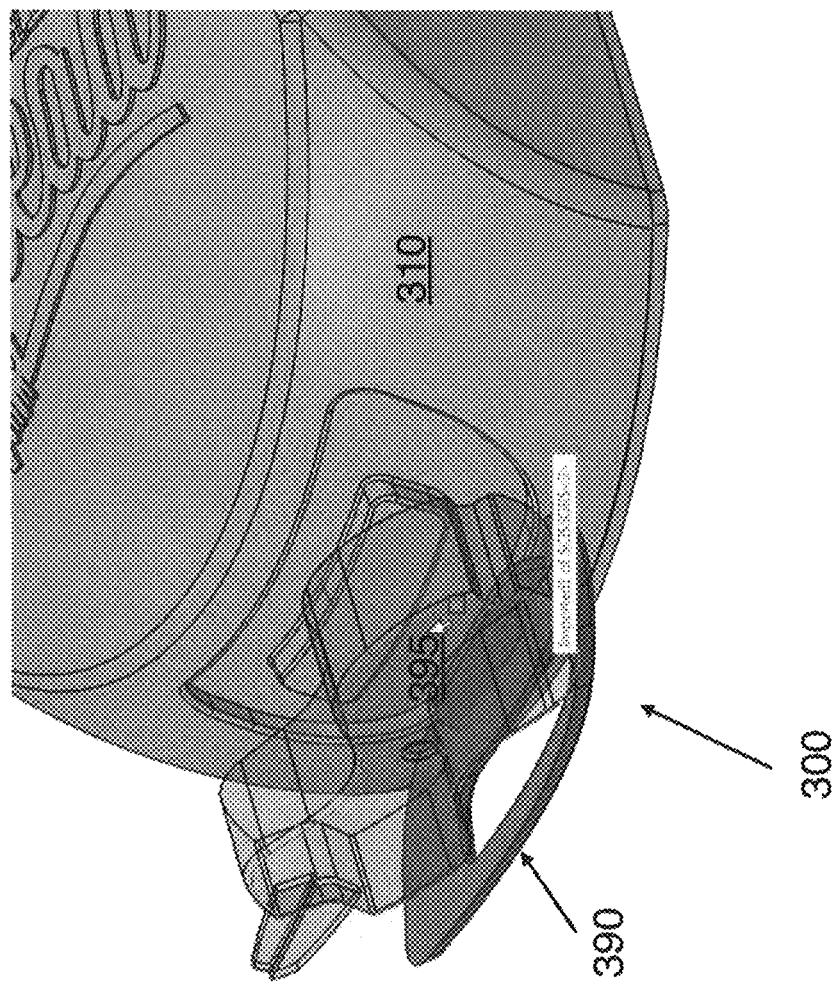

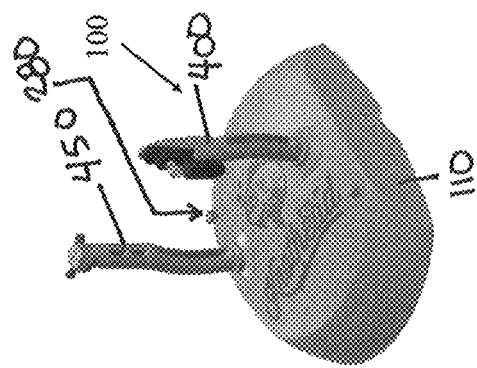
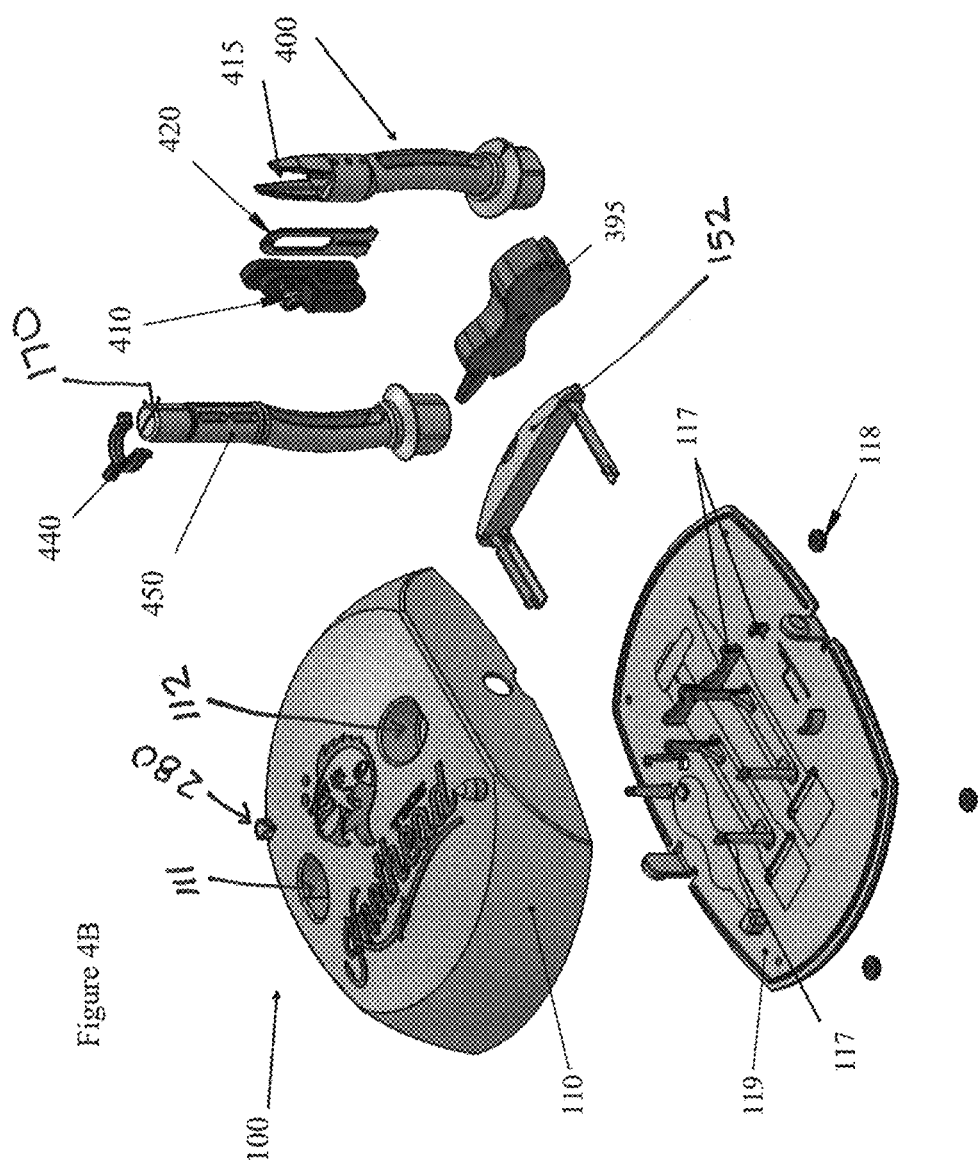
Figure 4A
Figure 4B

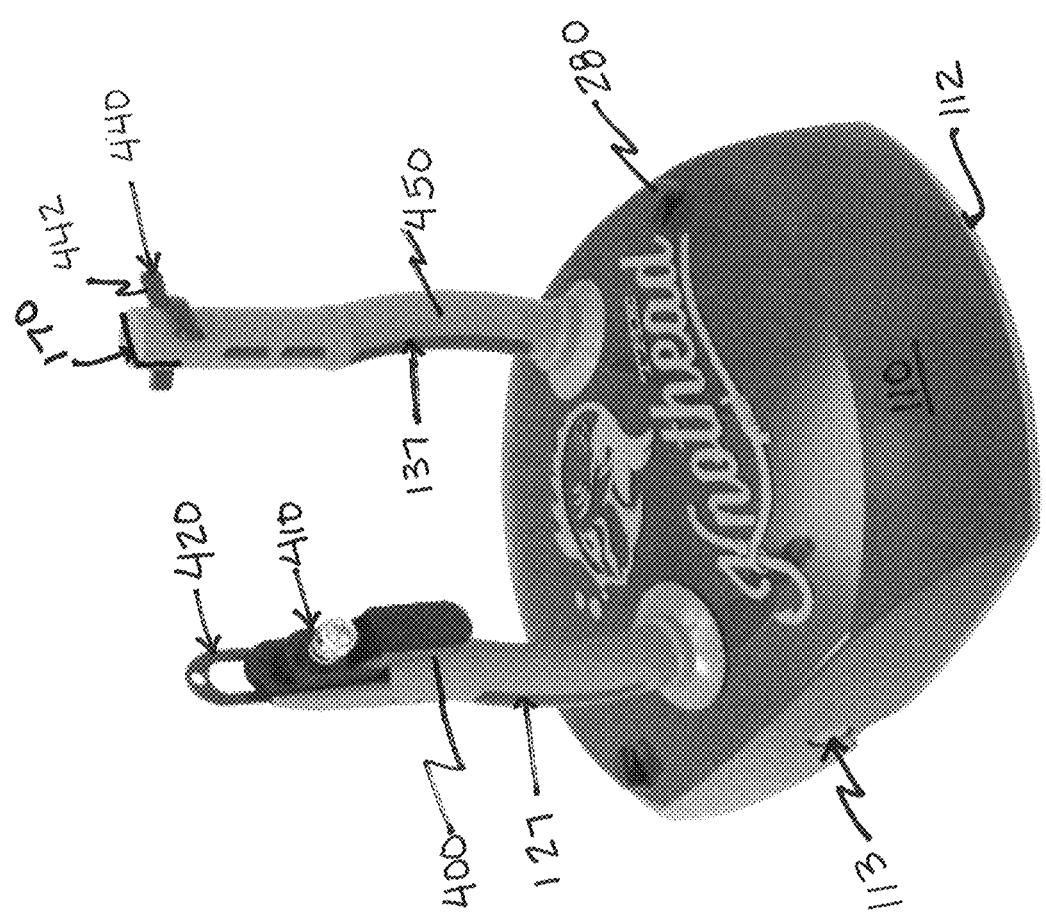

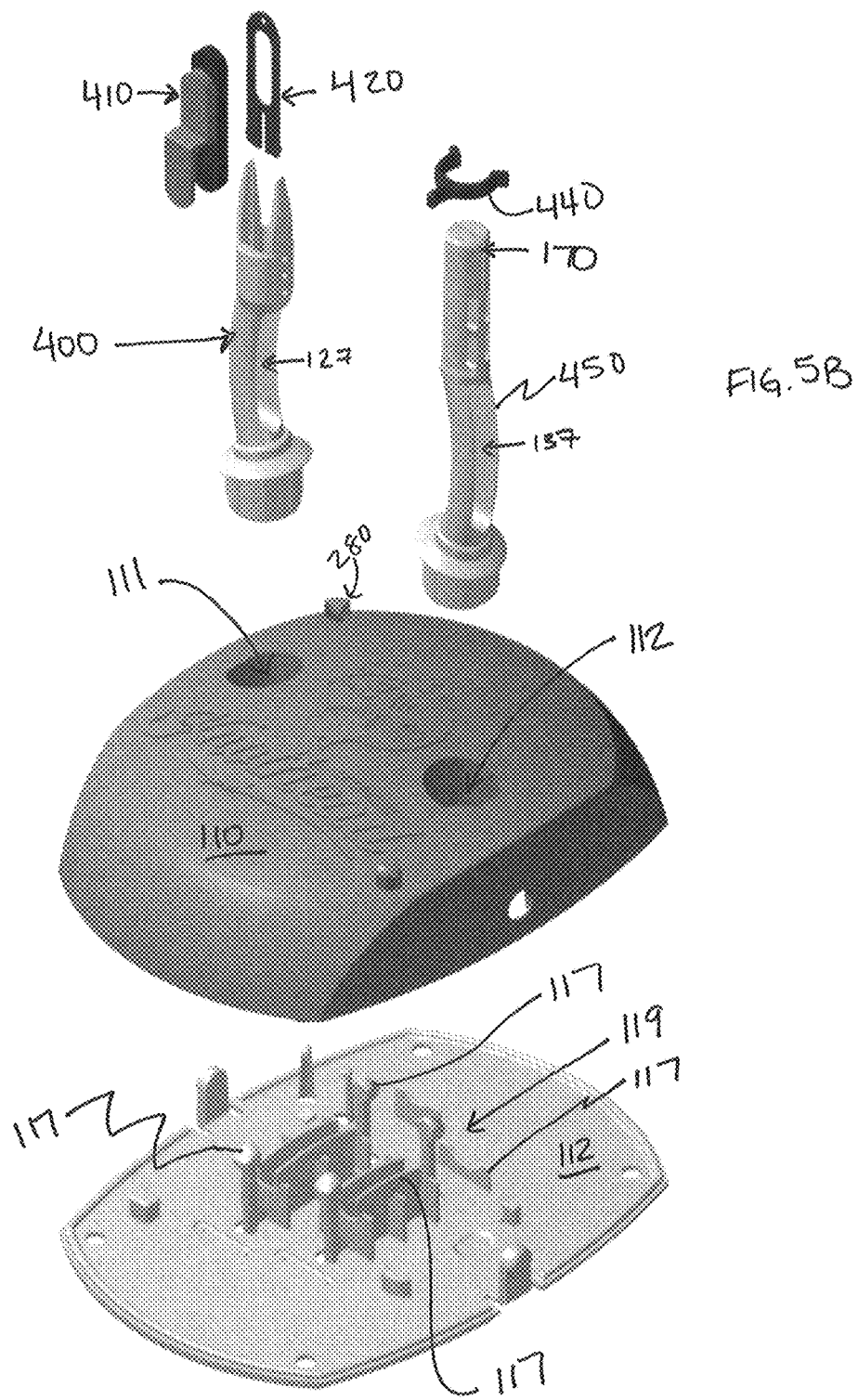

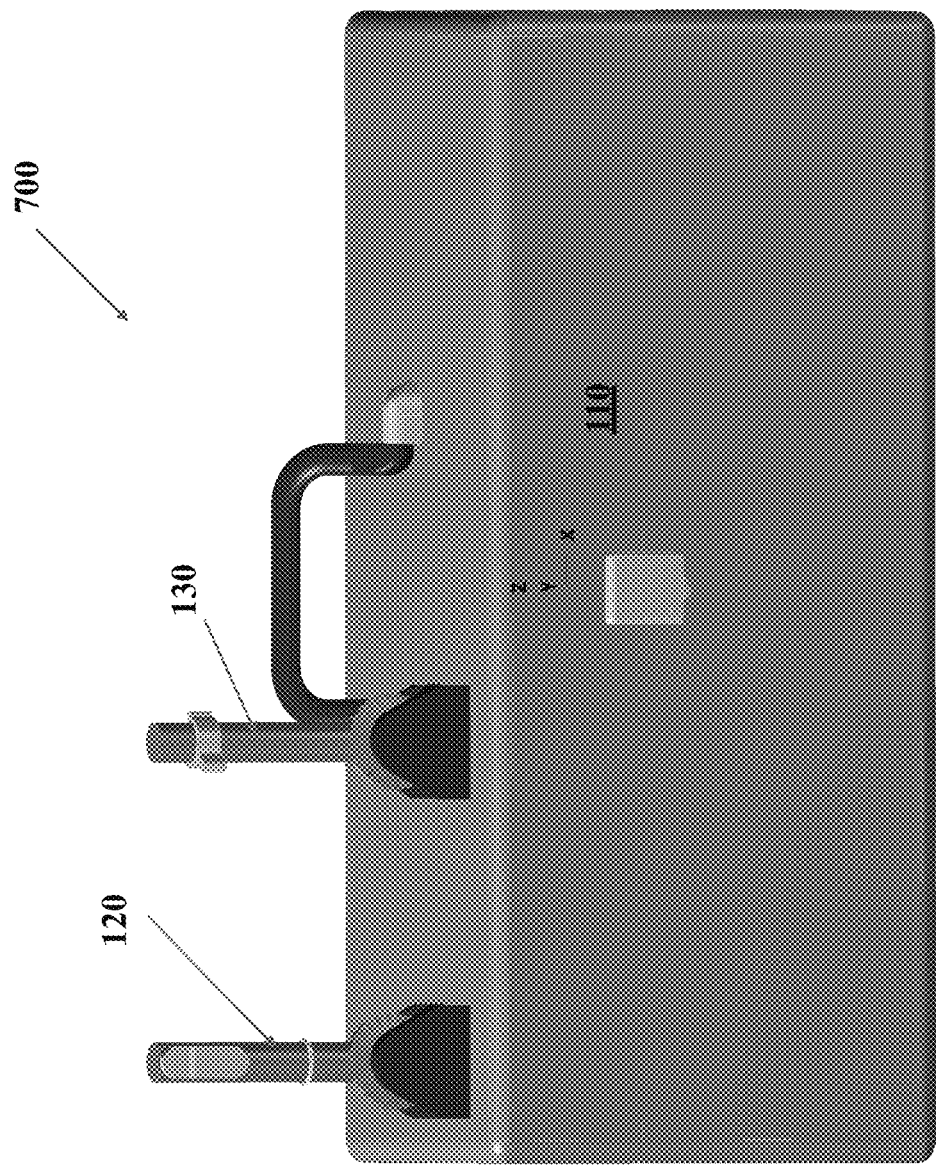

KNOTTING AID

CROSS-REFERENCE TO RELATED APPLICATIONS

This application claims the benefit of U.S. Provisional Patent Application No. 62/335,486 entitled "Knotting Aid", filed on May 12, 2016, which is hereby incorporated by reference.

TECHNICAL FIELD

The present invention relates to a device to facilitate knotting lines, such as fishing lines.

BACKGROUND

Hand tying fishing lines is common. Often a primary line is coupled to fishing accessories (e.g., lures, hooks, weights, etc.) and/or one or more other additional lines that include fishing lure(s). However, as fishing lines have become increasingly finer gauged, hand tying has become more difficult for even experienced fisherman. The fine gauged lines may be difficult to grasp without damaging and/or difficult to manipulate. In addition, some lines have line memory (e.g., the line may attempt to curl while holding it from being wound on a spool or reel and/or previous knots) that makes hand tying more difficult. Some lines are also difficult to hand tie due to wet conditions (e.g., user hands, line, bait, lures, etc.), motion (e.g., waves moving a boat and/or wind), and/or user conditions (e.g., age, poor eyesight, tremors in hands, etc.).

SUMMARY

In various implementations, a knotting device may be utilized to facilitate coupling a line with other line(s), one or more fishing accessories, with itself, and/or combinations thereof. The knotting device may include at least two arms. The arms may be removable and/or fixed. Each arm may include at least one coupling member. At least one first arm may include a stationary coupling member and at least one second arm may include a sliding coupling mechanism. In some implementations, second arm may include a slot.

In some implementations, during use, a primary line may be coupled to one or more secondary lines. A primary line may be positioned in a slot of a second arm of the knotting device. A part of the primary line may be wrapped at least partially around the second arm (e.g., such that the ends of the primary line may extend in the same direction), in some implementations. One or more parts of the primary line may be disposed in the stationary coupling member of the first arm. A secondary line may be disposed in the slot of the second arm, and the sliding coupling member may be positioned on the second arm to retain the secondary line and/or the primary line. The user may tie one or more knots to couple the primary and the secondary line. The primary line and the secondary line may released from the stationary coupling member and the sliding coupling member.

In some implementations, during use, a primary line may be coupled to a fishing accessory. A fishing accessory may be coupled to a first arm. A primary line may be positioned in a slot of a second arm of the knotting device. The sliding coupling member may be moved to retain the primary line. A portion of the primary line proximate a first end of the primary line may be coupled to the fishing accessory (e.g., threaded through an opening of the fishing accessory, wrapped around the fishing accessory, etc.). A user may then tie a knot using the first end of the primary line and the portion of the primary line between the two arms of the knotting device. In some implementations, a part of the primary line may be wrapped at least partially around the second arm (e.g., such that the ends of the primary line may extend in the same direction). The primary line and the fishing accessory may then be released from the knotting device.

In various implementations, a fishing knotting aid may include a base, arm(s), and coupling members. The base may include first opening(s) and/or second opening(s) disposed at least partially through the base. The arms of the knotting aid may include at least one first arm and at least one second arm. The first arm may include a first end and a second end capable of being at least partially received in at least one of the first openings of the base. The second arm may include a first end and a second end capable of being at least partially received in at least one of the second openings of the base. The first end of the second arm may include at least one slot. The slot may receive one or more fishing lines. The knotting aid may include first and second coupling member(s). Each arm may include at least one coupling member, in some implementations. A first coupling members may be disposed on at least one of the first arms. The first coupling members may secure one or more of the fishing lines to the first arm. The first coupling member may include a clamp. A second coupling members may be disposed on at least one of the second arms. A second coupling members may securing one or more of the fishing lines to the second arm. A second coupling member may include a sliding coupling member. The fishing knotting aid may couple with one or more of the fishing lines via at least one of the first coupling member and at least one of the second coupling member to allow a user to tie at least one knot in one or more of the fishing lines.

Implementations may include one or more of the following features. The knotting aid may include a spool holder (e.g., to hold a spool of line). The spool holder may be coupleable to at least one of the first arms and at least one of the second arms. For example, the spool holder may be coupled to the knot holder such that it is disposed between a first arm and a second arm. The spool holder may include the primary line, the secondary line, and/or other lines. The base may include curved protrusion(s) that may couple with fishing accessories. The base may include a cavity (e.g., disposed in a bottom portion of the base) and a removable cover disposed over the cavity. The cavity of the base may allow storage of first arm(s), second arm(s), first coupling member(s), and second coupling member(s), bait openings, fishing accessories, lurs, hooks, etc. The cavity of the base may include an organizer. In some implementations, at least one of the first coupling members may be disposed proximate the first end of the first arm and/or at least one of the second coupling members may be disposed proximate the first end of the second arm. The base may include at least one sliding coupling member holder (e.g., to couple with, hold, store, and/or retain sliding coupling member(s)). In some implementations, at least one of the second coupling members may be disposed proximate the first end of the second arm, and/or at least one third coupling member may be disposed on the second arm. The base may include and/or be coupled to a portion of a belt, a portion of a boat, a portion of a wrist band (see e.g., FIG. 12), a portion of a strap, a portion of an article of clothing, a portion of a seat (see e.g., FIGS. 13-14), a portion of a reel, a portion of a tackle box, or a storage compartment.

In various implementations, the knotting aid may include first arm(s) with at least one first coupling member and second arm(s) with at least one second coupling member. For example the knotting aid may include first arm(s) that includes at least one stationary coupling member(s) and second arm(s) that includes at least one sliding coupling member. The first arm(s) and/or the second arm(s) may include other coupling members, slots, and/or bait openings. A first arm may include a first end and a second end capable of coupling with a base. A second arm may include a first end and a second opposing end. The first end may include slot capable of receiving one or more fishing lines. A second end may couple with the base. A first coupling member may be disposed on (e.g., integrated with and/or coupled to) a first arm and a second coupling member may be disposed on (e.g., integrated with and/or coupled to) a second arm. The first coupling members may securing one or more of fishing lines (e.g., primary line, secondary line, and/or other line) to the first arm. The first coupling member may include a stationary coupling member, such as a clamp. A second coupling members may securing one or more of the lines to the second arm. The second coupling member may include a sliding coupling member, such as a two-armed member (e.g., c-shaped member, U-shaped member, etc.). The sliding coupling member may be flexible to facilitate taking the sliding coupling member on and/or off an arm and/or to facilitate sliding the sliding coupling member on an arm. The knotting aid may couple with one or more of the fishing lines via at least one of the first coupling member and at least one of the second coupling member to allow a user to tie at least one knot in one or more of the fishing lines.

Implementations may include one or more of the following features. The second end of the first arm may be at least partially received in at least one first opening of the base and/or the second end of the second arm may be at least partially received in at least one second opening of the base. In some implementations, the second end of the first arm may be coupled to the base via a fastener that allows the first arm to fold down (e.g., such that at least a portion of the length of the arm may contact the base and/or the arm is approximately parallel to a top surface of the base) and/or the second end of the second arm may be coupled to the base via a fastener that allows the second arm to fold down (e.g., such that at least a portion of the length of the arm may contact the base and/or the arm is approximately parallel to a top surface of the base). The fastener may be a hinge and/or a ratcheting mechanism. One or more of the arms may be telescoping arms. The base (e.g., a top surface of the base) may include one or more protrusions capable of coupling with the first arm(s) and/or the second arm(s). Protrusion(s) of the base may be disposed in recess(es) in the second end of the second arm and/or the first arm to couple an arm and a base. The knotting aid may include a bait opening disposed on the first arm(s) and/or the second arm(s). The bait opening may configured such that when an end of one of the first fishing lines is drawn through the bait opening, the bait opening may inhibit passage of bait coupled to the first fishing line. The knotting aid may includes two or more first arms coupled to the base and/or two or more second arms coupled to the base, in some implementations. A user may prefer to use more than two arms for some types of knots, in some implementations. A user may prefer to preset the knotting aid with more than two arms to facilitate switching between different configurations without removing and/or replacing arms between uses, in some implementations. The width of a slot may be adjustable. Arm(s) (e.g., first, second and/or other arms) may be foldable arm(s).

In various implementations, a tying a knot in one or more fishing lines may include positioning at least first portion of the first fishing line in a slot in a first arm of a fishing knotting aid and wrapping a second portion of the first fishing line at least partially around the second arm of a fishing knotting aid. The slot may include a closed end and a free end. The second portion may be proximate the first portion of the first fishing line. The second arm may be coupled to a base of the fishing knotting aid. At least two third portions of the first line may be coupled to a first coupling member of the fishing knotting aid. One of the third portions may extend from the first portion of the first fishing line and another third portion may extend from the second portion of the first fishing line. The second coupling member may include a stationary coupling member. The second coupling member may be coupled to a first arm of the base of the fishing knotting aid. A second fishing line may be positioned through a slot disposed in a first end of the second coupling member of the fishing knotting aid. A second coupling member may be slid on the second arm of the fishing knotting aid to inhibit the first fishing line and the second fishing line from passing through the free end of the slot. The first fishing line and the second fishing line may be coupled via at least one knot formed by a user. The first fishing line and the second fishing line may be uncoupled from the second arm by removing the first coupling member and/or the first fishing line and the second fishing line may be uncoupled from the first arm.

Implementations may include one or more of the following features. In some implementations, one or more additional lines may be coupled to the fishing knotting aid and/or at least one of the additional lines may be coupled to at least one of the first fishing line or the second fishing line. One or more fishing accessories may be coupled to the fishing knotting aid and/or lines (e.g., first, second, and/or other lines).

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 1C illustrates a side view of the implementation of the example knotting aid illustrated in FIG. 1A.

FIG. 1E illustrates a bottom perspective view of the implementation of the example knotting aid illustrated in FIG. 1A.

FIG. 1F illustrates a portion of the implementation of the example knotting aid illustrated in FIG. 1A.

FIG. 3 illustrates a portion of an implementation of a base of a knotting aid.

FIG. 4A illustrates an implementation of an example knotting aid.

FIG. 4B illustrates an exploded view of the implementation of the example knotting aid illustrated in FIG. 4A.

FIG. 5A illustrates an implementation of an example knotting aid.

FIG. 5B illustrates an exploded view of the implementation of the example knotting aid illustrated in FIG. 5A.

FIG. 7 illustrates an implementation of an example tackle box with a knotting aid.

Like reference symbols in the various drawings indicate like elements.

DETAILED DESCRIPTION

Figure 1A:
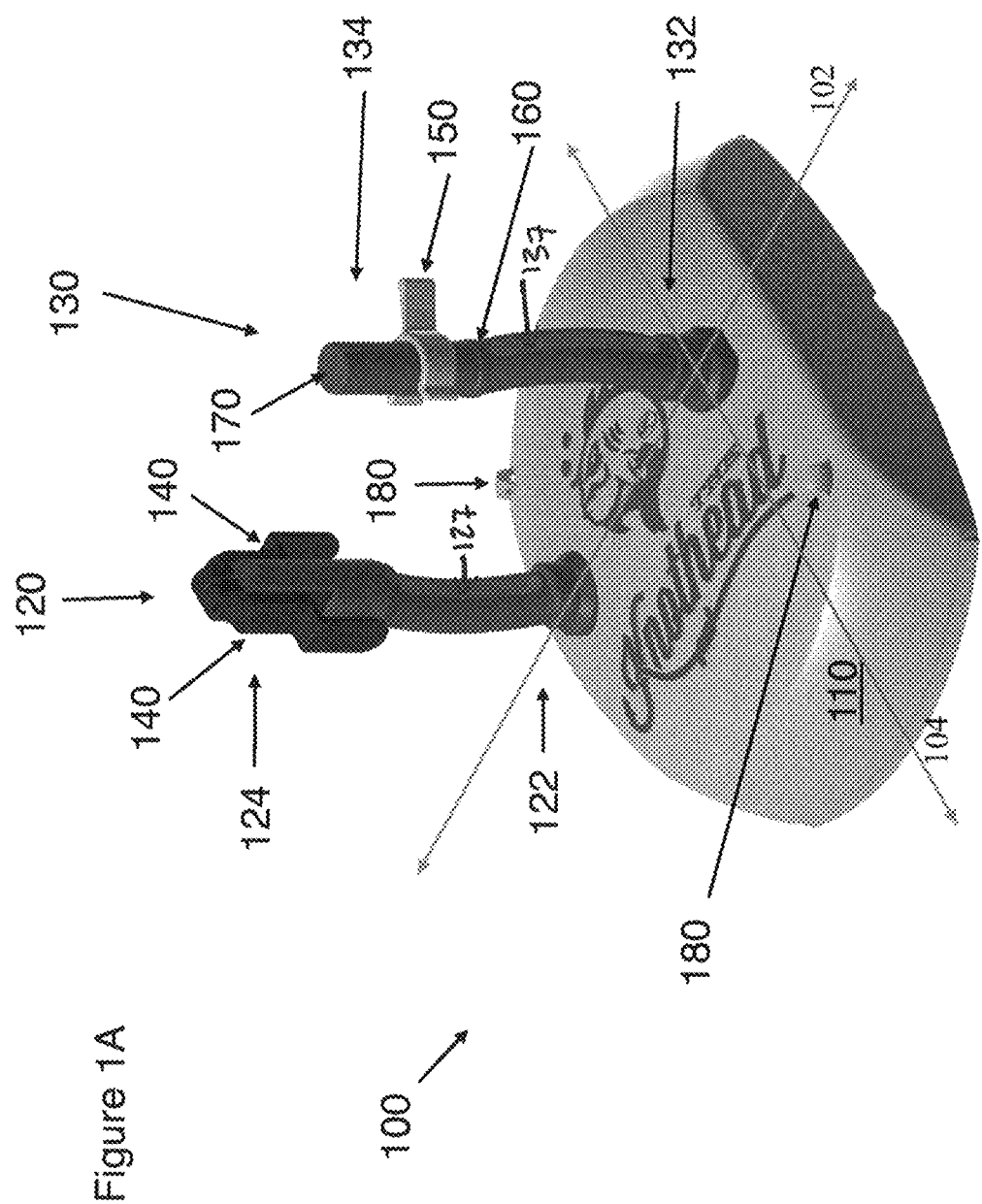
FIG. 1A illustrates a top perspective view of an implementation of an example knotting aid.
Figure 1B:
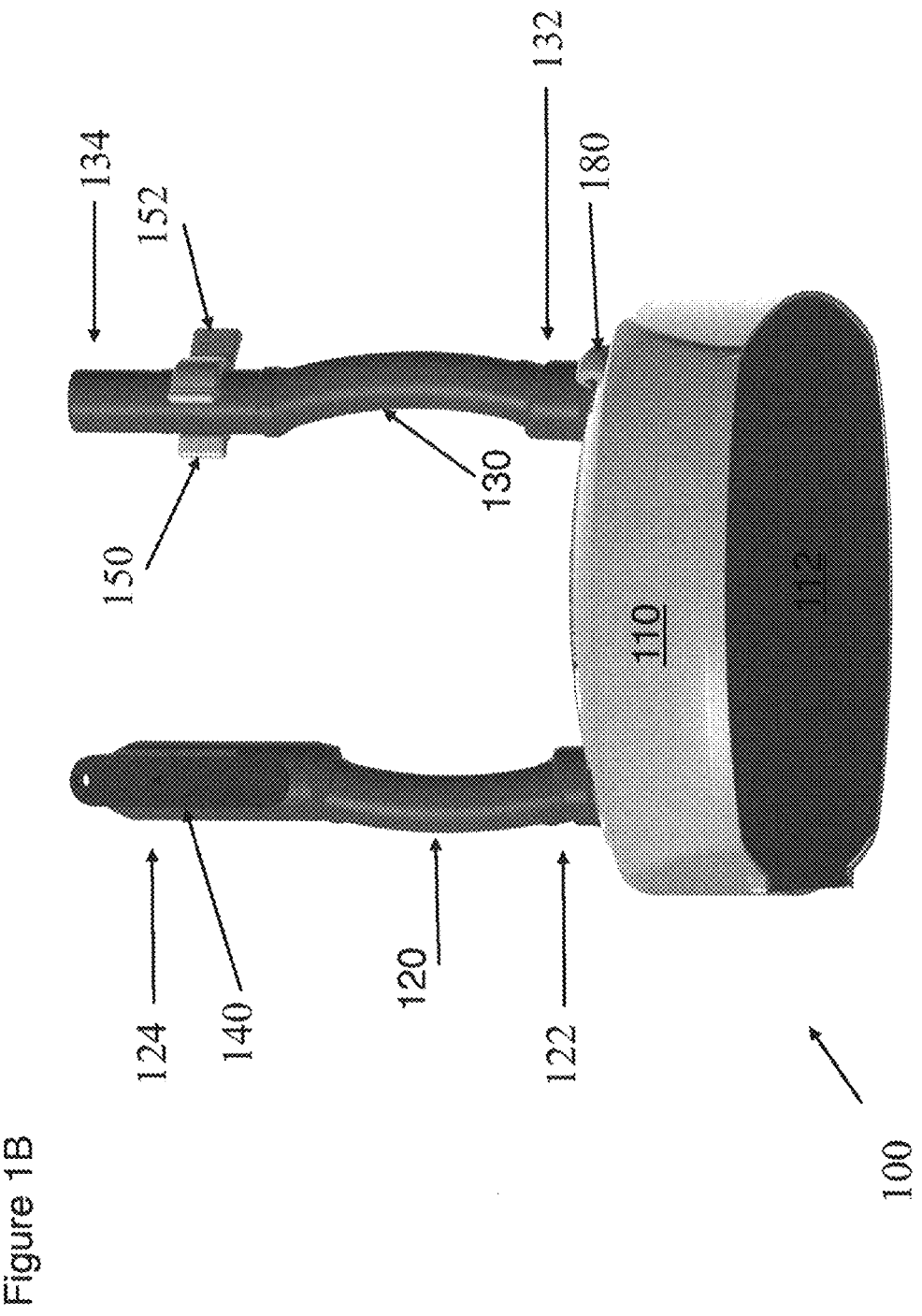
FIG. 1B illustrates a back perspective view of the implementation of the example knotting aid illustrated in FIG. 1A.

Hand tying may be difficult due to line properties (fine gauge lines, line memory, etc.), use conditions (e.g., movement from waves in a boat; wet lines, bait, lures and/or hands; slimy conditions from bait and/or water; etc.), and/or user conditions (e.g., poor eyesight, limited motor skills, hand tremors, etc.). In various implementations, a knotting aid may be utilized to couple two or more lines (e.g., cords, fishing lines), a line with itself, and/or a line with one or more fishing accessories. The knotting aid may stabilize (e.g., inhibit slipping) one or more of the lines to allow a user to couple lines via a hand tied knot, in some implementations. The knotting aid may hold two or more lines in a predetermined position relative to each other to facilitate coupling in some implementations. The knotting aid may allow retention of line(s) without substantially damaging (e.g., crushing, crimping, breaking, fraying, etc.) the line(s).

FIGS. 1A-1F illustrate an implementation of an example knotting aid 100. FIGS. 5A and 5B illustrate another implementation of the example knotting aid. The knotting aid 100 may include two or more arms coupled to a base 110.

The base 110 may have any appropriate size and/or shape. The base may be capable of resting upright on a planar surface (e.g., and not falling down) and/or coupleable to an object (e.g., clothing, tackle box, reel, boat, clothing, straps, bands, belts, etc.). The base may be designed to couple with arms of the knotting aid. For example, the base may include openings capable of receiving arms. The openings may extend at least partially through the base. In some implementations, the base may include a plurality of openings capable of receiving arms and a user may select two or more of the openings to couple the arms (e.g., based on user selected width for comfort when tying knots, based on knots to be formed, etc.). The base may include protrusions, and the arm(s) may include recesses to allow the base and the arms to couple. For example, one or more of the protrusions on the base may be disposed in recess(es) of an arm to couple the arm and the base. Other appropriate couplings may be used (e.g., snap fit connections, quick release connections, etc.).

As illustrated, the knotting aid 100 includes a first arm 120 and a second arm 130. In some implementations, the knotting aid may include more than two arms. An arm may include a height, a width, and a length. Each arm may include a first end, which couples to the base, and a second opposing end. The arm may include a base coupling member proximate the first end of the arm that is received by a opening in the base, in some implementations. For example, the arm may snap fit, frictionally fit, be bonded to, and/or otherwise coupled to the base.

An arm may include one or more coupling members. A coupling member may be fixed (e.g., integrated in the arm, fixedly coupled, etc.) or removably coupled to the arm. In some implementations, a coupling member may be disposed proximate the second end of an arm. Coupling members may include stationary coupling members (e.g., coupling members that do not move along a length of an arm) and/or sliding coupling members (e.g., coupling members that move along a length of an arm). For example, stationary coupling members may include clamps (e.g., spring clamps, hinge clamps, rotating clamps, and/or any other appropriate stationary clamp). Sliding coupling members include, but are not limited to, C-shaped clamps, o-rings, and/or other appropriate sliding coupling members. In some implementations, a knotting aid may include a first arm with at least one stationary coupling member and a second arm with at least one sliding coupling member. The first and/or the second arms may or may not include additional coupling members.

As illustrated, the first arm 120 may include a first end 122 that couples to the base 110 (e.g., via a base coupling member) and a second opposing end 124. The second opposing end 124 of the first arm may include one or more stationary coupling members 140. A stationary coupling member may be a coupling member that is coupled (e.g., removably and/or fixed) to a predetermined position on the first arm. The stationary coupling member may include a clamp such as, but not limited to, a spring clamp (e.g., the clamp may include a lever that when pressed opens the clamp or vice versa). The clamp may inhibit damage to the line retained by the spring clamp. For example, the clamp (e.g., spring clamp) may be designed such that a line is contacted by two approximately parallel plates (e.g., a clamp may include two plates activated by at least one arm, where the plates are closer together when a line is retained than when the line is released). By utilizing a clamp with approximately parallel plates (e.g., rather than plates at an angle which is common in clamps), pressure may not be applied unevenly to a portion of the line, which may cause damage (e.g., crimping, bending, fraying, breakage, etc.). The stationary coupling member may allow one or more lines to be retained by the knotting device. For example, a stationary coupling member may be opened (e.g., by depressing a lever of the clamp, by rotating a lever of the clamp, etc.) and one or more lines may be disposed in the opening. The stationary coupling member may then be closed to allow the line(s) in the opening to be retained. The stationary coupling member may retain line(s) without substantially damaging the line(s) (e.g., crimping, breaking, bending, fraying, etc.). For example, the pressure applied by the clamp to the lines may be such that the line(s) retained by the stationary coupling member are not substantially damaged. In some implementations, the stationary coupling member may include coatings, sleeves, padding, etc. to inhibit substantial damage to the line(s) retained by the stationary coupling member. The stationary coupling member may be opened (e.g., press a lever of the clamp, rotate a lever of the clamp, etc.) to release the line from the stationary coupling member.

In some implementations, the first arm 120 may include more than one stationary coupling member 140 and/or other coupling members. For example, a first stationary coupling member may be disposed on a posterior surface of the first arm and a second stationary coupling member may be disposed on an anterior surface of the first arm (e.g., at the same or different heights on the first art). In some implementations, a first stationary coupling member may be coupled to the first arm at a first predetermined height and one or more second stationary coupling members may be coupled to the first arm at different predetermined heights. Including more than one stationary coupling member may facilitate use by left handed and/or right handed users; may facilitate complex knot tying; may allow primary and/or secondary lines to be retained (e.g., by the stationary clamp at an angle relative to other lines); may allow a line to be retained out of the way to allow other secondary lines to be coupled with the primary line and/or secondary line; may facilitate tying of some types of knots, and/or any other appropriate purpose.

As illustrated, the knotting device may include a first clamp, as a first stationary coupling member, and a second clamp, as a second stationary coupling member. The first stationary coupling member and the second stationary coupling member may be disposed on opposing sides of the same arm at approximately the same height on the first arm. Utilizing two clamps at approximately the same predetermined height on the first arm may facilitate use for right-handed and/or left-handed users and/or may facilitate retention of line(s) for specific knots.

The second arm 130 may include a first end 132, which couples to the base 110, and a second opposing end 134. The second opposing end 134 may include one or more sliding coupling member 150. The sliding coupling member may slidably move along at least a portion of a height of the second arm. The sliding coupling member may be removable from the second arm. For example, the sliding coupling member may include a slit that allows expansion of the sliding coupling member to remove the sliding coupling member from the arm, the sliding coupling member may be elastically deformable to allow removal of the sliding coupling member.

The sliding coupling member may be a two-armed clamp such as a c-shaped clamp, in some implementations. The c-shaped clamp may include two arms. In some implementations, the arms of the c-shaped clamp may be flexible (e.g., elastically deformable). The sliding coupling member may include an o-ring (e.g., a flexible and elastic annular ring that can slide along an arm and retain a line) and/or ring with a different shape (e.g., square shaped ring, oval ring, etc.) in some implementations. The sliding coupling member may include a handle 152 to facilitate gripping (e.g., by a user) and/or moving the sliding coupling member. The sliding coupling member may allow a line to be retained by the knotting device. For example, a first line may be positioned proximate the sliding coupling member and the sliding coupling member may be slid to contact and retain the line. The sliding coupling member may retain the line between an inner surface of the sliding coupling member and an outer surface of the arm. In some implementations, the sliding member may allow line(s) to be retained in an arm by inhibiting upward movement of the lines (e.g., which would remove the lines from the slot) in a slot of an arm. The sliding member may allow the line to be retained without substantially damaging the line (e.g., breaking, bending, fraying, etc.). For example, the sliding coupling member may include coatings, sleeves, padding, etc. to inhibit substantial damage to the line(s) retained by the stationary coupling member. The sliding coupling member may be slid away from the line to release the line. For example, the sliding coupling member may be slid away from the slot in which the line is retained to release the line (e.g., slide the sliding coupling member towards the base). In some implementations, the sliding coupling member may be coupled to the arm to retain a line (e.g., by trapping lines in a slot of the arm) and removed from an arm to release the line(s). In some implementations, the sliding member may be able to retain more than one line without substantially damaging the line.

In some implementations, the second arm may include one or more retainers 160 that restrict movement of the sliding coupling member 150. As illustrated, the retainer may inhibit movement of the sliding coupling member in the direction towards the base. The retainer may facilitate use by inhibiting the sliding coupling member from traveling to the base of the knotting aid, which may decrease user satisfaction (e.g., since the user may have to slide the sliding coupling member farther to couple with a line). In some implementations, the retainer may be positioned proximate an inner end of the slot to facilitate placement of the sliding coupling member when retaining line(s) in the slot (e.g., while maintaining space in a slot such that the line(s) are not crushed).

The second arm 130 may include at least one slot 170. The slot may have a free end, through which lines may be inserted into the slot and a closed end, in some implementations. The closed end may allow positioning of line(s) in a predetermined orientation (e.g., to allow line(s) to be maintained in an approximately parallel orientation with the base when coupled to the first and second arms).

As illustrated, a slot 170 may be disposed in a second end 134 of the second arm 130. The slot 170 on the second arm 130 may have a depth 172. The slot may extend from the second end of the second arm. As illustrated, the slot may extend vertically downwards from the top surface of the second end. In some implementations, the slot may extend from a side of the second end of the second arm (e.g., horizontally and/or at an angle) and/or a sliding clamp may cover at least a portion of a free end of the slot to inhibit movement of lines in the slot. The slot may have a width

Figure 2:
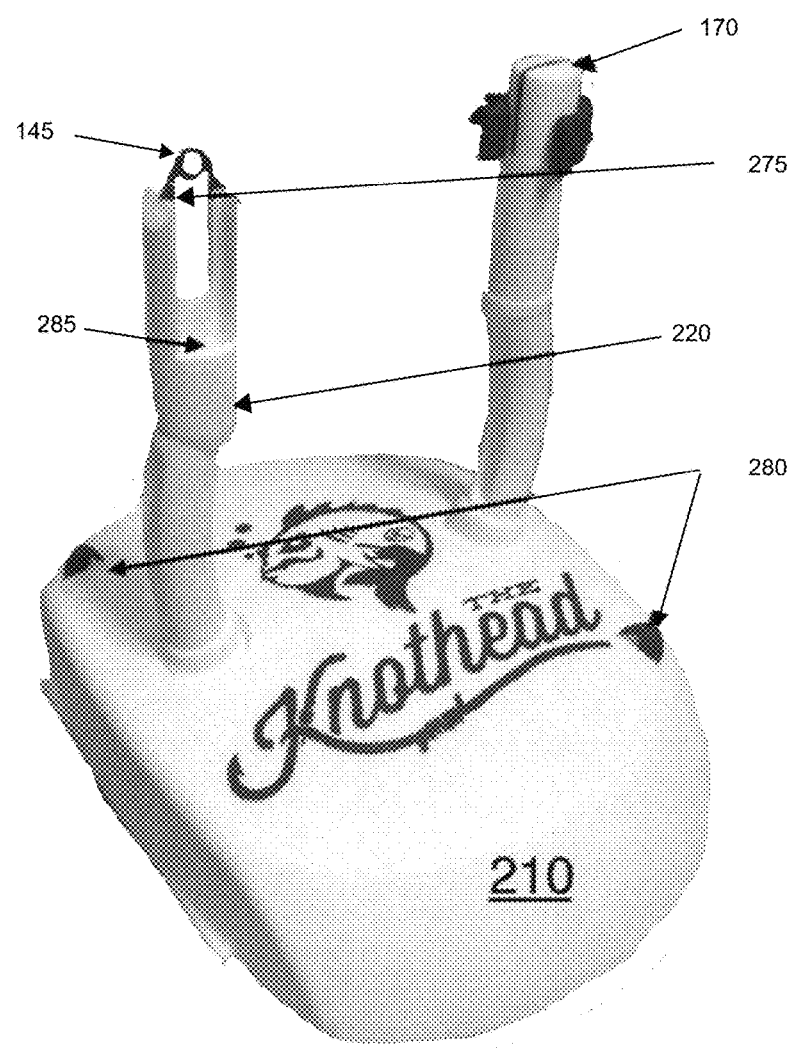
FIG. 2 illustrates a top perspective view of an implementation of an example knotting aid.

174. The width of the slot 170 may have a size and/or shape to allow one or more lines to be disposed in the slot. For example, a line may pass through the slot. The slot may have a length similar to the arm to allow a line to pass through the arm via the slot (e.g., the slot may extend from a first side to a second side of a top surface of the second end of the arm). The width of the arm may be selected to allow a predetermined gap between portions of a line positioned in a slot. In some implementations, a first arm 220 may include a slot 275, as illustrated in FIG. 2. The slot may be disposed on the first arm to retain lines (e.g., retained by the coupling member, to facilitate knotting, to facilitate manipulation of lines, to maintain tension on a line, etc.). In some implementations, the slot 175 may not add tension to the line, but may keep a line at a position relative to the knotting device (e.g., out of the way, in a desired spot for knotting, etc.).

In some implementations, one or more of the arms may include one or more slots. For example, the first arm may include a stationary coupling member and slot(s). The second arm may include more than one slot, in some implementations. Utilizing arms with more than one slot may allow a user to select a slot for retaining the line(s) that position the line(s) in a specific orientation (e.g., height and/or angle relative to the other line and/or arm) for knot tying.

In some implementations, a sliding coupling member may be allowed to move in an area proximate and/or including the area of the arm in which the slot is disposed (e.g., second arm 130 for slot 170). Thus, allowing the sliding coupling member to contact at least a portion of a line that is partially disposed in the slot. Contacting the line(s) may inhibit release of the lines (e.g., through the free end of the slot and/or by passage of an end of the line through the slot). In some implementations, the sliding member may not contact the lines but restrict movement of line(s) in the slot of the arm to inhibit release of the lines through the free ends.

Utilizing a slot may facilitate creation of a loop in a portion of a line, which may facilitate knot tying. For example, since a portion of a line disposed in the slot may be wrapped at least partially around the arm, a gap 180 will reside between the parts of the line when the parts extend in the same direction. This gap 180 may facilitate knot tying in using the line.

In some implementations, a knotting device that includes a first arm with a stationary coupling member such as a clamp and a second arm with a slot and a sliding coupling member. Utilizing this configuration may allow a gap between two parts of a primary line and/or loop to be created in a portion of the primary line and allow a tension to be maintained in the primary line (e.g., via the stationary clamp) to facilitate knot tying. The coupling between lines may represent a weak point in a line system (e.g., two or more lines coupled together), thus creation of a tight coupling at this point may reduce the weakness of this point. Maintaining the tension in the primary line while coupling secondary line(s) to the primary line may allow a tighter knot to be created which may decrease the weakness of the joint (e.g., when compared with a knot tied without the knotting device).

The first arm 120 and the second arm 130 may be coupled to the base at a predetermined distance from each other. For example, the distance between the first arm and the second arm may be approximately 4 inches to approximately 12 inches. The first arm 120 and the second arm 130 may have any appropriate size and/or shape. For example the first arm 120 and the second arm may be approximately 3 to 8 inches high. In some implementations, the first arm and/or the second arm may be approximately 5.5-approximately 6.5 inches high. The first arm and the second arm may have approximately similar heights, in some implementations. The first arm 120 and/or the second arm 130 may be curved to allow a greater distance to reside between an area proximate the first ends of the arms 120, 130 than the distance residing between an area proximate the second ends of the arms 120,130.

In some implementations, the slot in the first arm and/or second arm may have a width (e.g., distance between walls of the slot) of approximately 0.2 inches-approximately 0.4 inches. The width of the slot may be approximately 0.25 inches to approximately 0.35 in some implementations. A height of the slot may be less than 1 inch. For example, the height of the slot may be approximately 0.7 inches to approximately 0.85 inches. In some implementations, a height of the slot may be approximately 0.5 inches to approximately 1.5.

In some implementations, the slot width may alter along a height of the slot. For example, the width of the slot may vary by approximately 0.02 to approximately 0.04 inches along a height of the slot. For example, a first end (e.g., proximate the second end of an arm) of the slot may have a greater width than a width of a second opposing end of the slot. Decreasing a width of the slot may facilitate retention of a line in the slot proximate a second end of the slot. For example, a width of a slot proximate the first end of the slot may be approximately 0.3-0.32 inches and a width of the slot proximate the second end of the slot may be approximately 0.27-0.29 inches. In some implementations, the width of the slot proximately the first end of the slot may be less than the width of the slot proximate the second end of the slot. Increasing the width of the slot may facilitate retention of a line disposed in the line since a force may be required to remove and/or dispose the line at least partially in the slot.

A first axis 102, a second axis 104, and a third axis 106 may be defined relative to the knotting aid. The first axis 102 and the second axis 104 may be perpendicular to each other. The third axis 106 may be normal to the first axis 102 and the second axis 104. The base of the knotting aid may reside in a plane that includes the first axis 102 and the second axis 104. The arms 120, 130 of the knotting aid may extend in the direction of a plane that includes the third axis 106 and the second axis 104. In some implementations, the arm(s) may be perpendicular and/or slanted relative to the third axis 106. The slot 170 in the second arm 130 may or may not be parallel to the second axis 104 in some implementations. As illustrated, the slot 170 may be parallel to the opening in the stationary coupling member (e.g., such that a line may be retained in the plane formed by the second axis 104 and the third axis 106).

In various implementations, the knotting aid may be utilized to couple a line with other line(s) or fishing accessories. FIGS. 1G and 1H illustrate implementations of lines coupled to the knotting aid. For example, a knotting aid with two arms may be obtained (e.g., assembled from a kit, and/or otherwise obtained). The knotting aid may include a first arm with at least one stationary coupling member (e.g., a clamp) and a second arm with at least one sliding coupling member (e.g., a sliding clip). The second arm may include a slot disposed through at least a portion of a second end of the arm. As illustrated the slot may extend from a second end of the arm. At least a portion of the slot and at least a portion of the stationary coupling member may be in the same plane (e.g., plane that includes the third axis and the second axis) and/or approximately parallel with the base.

In some implementations, a primary line 195 (e.g., primary fishing line, secondary fishing line, etc.) is positioned such that a first portion of the primary line is disposed in the slot. A second portion of the primary line is then wrapped around the second arm such that the primary line is extending in the same direction (e.g., a third portion proximate the first portion and a fourth portion proximate the second portion may extend in the same direction such as towards the first arm). For example, the primary line may be bent into a u-shape and one arm of the "u" may be disposed in the slot. By positioning the primary line in the slot in the second arm such that the primary line is extending in the same direction, a gap is created and maintained between the two portions of the primary line extending in the same direction. This gap may facilitate knot tying by a user (e.g., since the secondary line may not need to be threaded through a small opening between two parts of the primary line, since the user may not have to create an opening between the two parts of the primary line, etc.). In some implementations, the sliding coupling member may be removed from the second arm prior to disposing the primary line in the slot. The sliding coupling member may be positioned below the slot on the second arm, in some implementations.

The primary line (e.g., the third and fourth portions extending from the slot in the second arm) extending from the second arm is coupled to the first arm via the stationary coupling member. For example, the stationary coupling member may include a spring clamp. An arm of the spring clamp may be depressed to open the spring clamp and the two portions of the primary line may be disposed in the opening. The spring clamp may be activated to allow the retention of the line using the spring clamp (e.g., by not applying a force on the arm of the spring clamp) The secondary line 198 (e.g., a lead line) may then be disposed in the slot of the second arm. In some implementations, the secondary line may be disposed in a predetermined position in the slot based on the type of knot the user will utilize to couple the lines (e.g., positioned such that the secondary line is disposed in the gap between two portions of the primary line, positioned such that the secondary line is on a side of the two portions of the primary line, etc.). The sliding coupling member may then be positioned in a first position to retain the secondary line and/or primary line. For example, in the second position, the sliding coupling member may contact the secondary line and/or the primary line. In the second position, the sliding coupling member may be disposed above a closed end of the slot to inhibit the lines from moving upwards (e.g., away from the base) and releasing through the free end of the slot.

The user may then tie a knot to couple the primary and the secondary lines. The sliding coupling member may then be move to a second position (e.g., below the slot and/or taken off the second arm) and the stationary coupling member may be activated to release the lines from the knotting aid. In some implementations, the lines may be pulled once released from the knotting aid to tighten the knot.

Although FIGS. 1G and 1H illustrate two orientations and coupling of line(s) with the knotting aid, lines may be coupled to the knotting aid in different relative orientations. For example, based on the type of knot the user is creating, the lines may be appropriately coupled to the arms of the knotting aid. For example the secondary line may be coupled to the first arm. In some implementations, the primary line and the secondary line may be coupled to the first and second arms, and an additional line may be used to create a knot (e.g., to knot one or more of the lines together, to attach fishing accessories, etc.).

In some implementations, the knotting aid may be utilized to create a knot in a primary line and/or a couple a primary line to a fishing accessory such as a hook, bait, lure, etc. For example, a knotting aid with two arms may be obtained (e.g., assembled from a kit, and/or otherwise obtained). The knotting aid may include a first arm with at least stationary coupling member (e.g., a clamp) and a second arm with at least one sliding coupling member (e.g., a sliding clip). The second arm may include a slot disposed through at least a portion of a second end of the arm. At least a portion of the slot and at least a portion of the stationary coupling member may be in the same plane (e.g., plane that includes the third axis and the second axis) and/or parallel with the base. During use, a primary line (e.g., primary fishing line, secondary fishing line, etc.) is positioned such that a portion of the primary line is disposed in the slot. A portion of the primary line is then wrapped around the second arm such that the primary line is extending in the same direction. For example, the primary line may be bent into a u-shape and one arm of the "u" may be disposed in the slot. By positioning the primary line in the slot in the second arm such that the primary line is extending in the same direction, a gap is created and maintained between the two portions of the primary line extending in the same direction. This gap may facilitate knot tying by a user (e.g., since the secondary line may not need to be threaded through a small opening between two parts of the primary line, since the user may not have to create an opening between the two parts of the primary line, etc.). In some implementations, the sliding coupling member may be removed from the second arm prior to disposing the primary line in the slot. The sliding coupling member may be positioned below the slot on the second arm, in some implementations. After the primary line is disposed in the slot, the sliding coupling member may be disposed in position to retain the primary line in the slot. A part of the primary line may be retained in a slot in the first arm, in some implementations.

A fishing accessory (e.g., bait, hook, weight, etc.) may be coupled to the first arm via the stationary coupling member 140 and/or bait opening 125. For example, the stationary coupling member may include a spring clamp. An arm of the spring clamp may be depressed to open the spring clamp and the fishing accessory may be disposed in the opening. In some implementations, the fishing accessory may be disposed in an opening of the bait opening (e.g., between arms of the bait opening, in an arm of the bait opening, etc.) to retain the fishing accessory. The bait may be larger that the bait opening, and thus the bait may be retained on one side of the bait opening. In some implementations, the opening of the bait opening may include a slot (e.g., passing through the opening and/or between arms of the bait opening) to allow a line to pass though the slot while retaining the bait on one side of the bait opening. This may allow the coupled bait to be more easily released when after the knot is tied (e.g., by allowing the line coupled to the bait to pass through the slot rather than pulling an end of the line through the slot). A part of the primary line may then pass through an opening and/or be wrapped around the fishing accessory and a user may hand tie the knot to couple the primary line and the fishing accessory. The sliding coupling member may then be move to a second position (e.g., below the slot and/or taken off the second arm) and/or the stationary coupling member may be activated to release the line and bait from the knotting aid. In some implementations, the line may be pulled once released from the knotting aid to tighten the knot.

In some implementations, the knotting aid 100 may include one or more protrusions 180. FIG. 2 illustrates an implementation of an example knotting aid 200. The protrusion(s) 280 may be disposed on a top surface of a base 210. The protrusions may be curved (e.g., hooked) and/or include an aperture capable of coupling with a hook. The protrusion may be adapted to couple with fishing accessories such as bait, hooks, etc. For example, the protrusion may be hook shaped such that a fishing hook may link onto the protrusion to couple to the protrusion. The protrusion may include an aperture and the hook may pass through aperture to link the hook to the protrusion and/or base. In some implementations, hook may be larger that the opening between the protrusion and the base, and thus the hook may be retained on one side of the protrusion. In some implementations, the protrusion may include two flexible protrusions that retain objects between the flexible protrusions. When a user creates a terminal knot, the protrusion may be utilized to maintain tension in the line or to be capable of applying tension to the line to tighten the knot.

In some implementations, the knotting aid may include one or more sliding coupling member holders. FIG. 1I illustrates an implementation of a base 110 with a sliding coupling member holder 153 disposed on the base. The sliding coupling member holders 153 may include protrusion(s) (e.g., cyclindrical, annular ring, and/or any other appropriate shape) extending from the base 110 and/or recess(es) in the base that are capable of coupling with sliding coupling member(s) 150. For example, the holder may include a protrusion of a similar size and/or shape to a portion of an arm such that sliding coupling member(s) may be disposed on the protrusion. The holder may include a recess with a size and/or shape to receive sliding coupling member(s) such that sliding coupling members may be disposed at least partially in the recess and be retained. The holder may increase user satisfaction by providing a location on which sliding coupling members may be coupled when not on the arm (e.g., disposing a line in the slot, when releasing line(s), when not in use, etc.) and/or by providing a location on which extra sliding coupling members may be coupled. Since the knotting aid may be used in boats, water movement may cause the knotting aid to be displaced and the holder may retain removed sliding coupling members during use and inhibit loss of the sliding coupling members, in some implementations.

In some implementations, one or more of the components of the knotting aid 100 may be removable. For example, a base 110 may include a cover 112 that is removable. The base may include a cavity and the cover may be disposed over the cavity when the base is closed. The cover may clip onto the base, be coupled via a hinge, and/or couple to the base using any other appropriate type of connection. In some implementations, the base may include a cavity 114 in a bottom surface that allows storage of one or more of the removable components (e.g., arms, coupling members, etc.) in the cavity. FIG. 1F illustrates an implementation of an example of a storage portion 111 of a base 110. As illustrated, arms 120, 130, coupling members 140, and/or a cutting tool may be stored in the storage portion 111. FIGS. 4A and 4B illustrated an exploded view of an example knotting aid. As illustrated, the base 110 may include recesses and/or openings in which arm(s) may be disposed. For example, a user may assemble (e.g., for use) and/or disassemble (e.g., for storage) the knotting aid. The user may open the cover of the base and remove components, such as arms and couple the arms to the base via the openings. The user may couple coupling members to the arms (e.g., based the coupling members included in the kit and/or based on use of the knotting aid). The user may then utilize the knotting aid to couple a line to itself and/or with other items (e.g., lines, accessories, etc.).

The storage portion may be disposed in and/or formed in the cavity of the base 110. For example, a cover of the base may be removed and the components may be removed or disposed in the opening. The cover may then be replaced over the cavity of the base. The cavity may be in the top surface of the base and a cover may be disposed over the cavity in the top surface. The arms may be coupled to the cover of the base during use, when the cavity is disposed in the top surface of the base. In some implementations, the cavity of the base may include accessories such as additional coupling members, hooks, lures, weights extra arms, and/or any other appropriate accessory. The cavity may include retention members 117 to couple one or more components and/or accessories of the knotting aid in the cavity of the based (e.g., when not in use). When a user assembles the knotting aid, the user may remove components of the knotting aid and couple the components to each other and/or to the base. In some implementations, one or more components of the base may remain stored in the cavity of the base after assembly based on the user of the knotting aid and/or selected (e.g., by the user) assembly.

In some implementations, one or more arms 120, 130 may be removable from the base 110. For example, an arm may include a base coupling member proximate a first end that allows an arm to couple with and/or uncouple with a recess in the base.

In some implementations, one or more coupling members may be removable from an arm. For example, a sliding coupling member may be removable from an arm. The first arm 210 in FIG. 2 illustrates an example of an arm with a removable coupling member. As illustrated a first arm 210 may include a receiving member 285 into which a coupling member (not shown) may be disposed. For example, an arm may include one or more recesses (e.g., a set of parallel recesses on opposing sides) and/or protrusions (e.g., to which the coupling member couples), and/or other appropriate receiving member into which the coupling member may be disposed. Thus, the knotting aid may be configured based on user specifications and/or knot requirements (e.g., slanted lines).

In some implementations, a bait opening 145 may be coupled to the arm (e.g., after removal of the coupling member). The bait opening may be any appropriate regular and/or irregular shape (e.g., circle, c-shaped, etc.). As illustrated, the bait opening may include a loop in some implementations. During use, a line that is already coupled to a fishing accessory, such as bait, may utilize a bait opening. A first end of the line may be drawn through the bait opening such that the fishing accessory contacts the bait opening. For example, a fishing accessory may be larger than the bait opening and retained on one side of the bait opening. The first end of the line may then be coupled to a coupling member of one of the arms (e.g., slot and sliding coupling member, clamp coupling member, etc.) of the knotting device for knotting. The bait opening may include a variety of other shapes, such as for example, include a c-shaped bait opening formed in a second end of the arm. During use, a user may retain the bait via the bait opening. In some implementations, the bait may fit at least partially between the c-shaped arms of a bait opening and be retained at least partially in the bait opening. By utilizing a bait opening, damage to the line and/or fishing accessory coupled to the line may be inhibited (e.g., to allow a knot to be tied close to the fishing accessory without having to place the fishing accessory in a clamp and/or to inhibit contact and thus potential damage with the line proximate the fishing accessory).

Figure 16A:
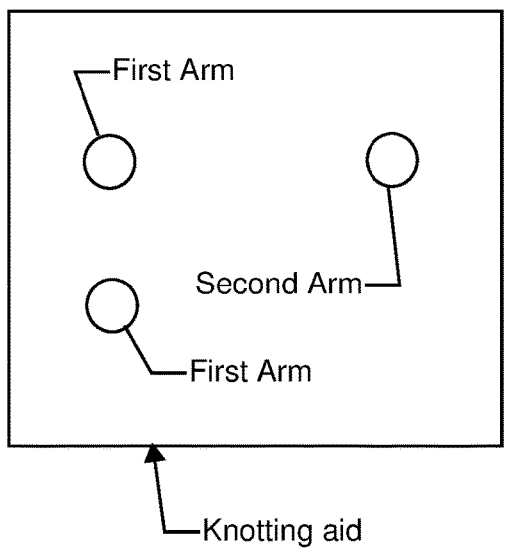
FIG. 16A illustrates an implementation of a knotting aid with more than one first arm.
Figure 16B:
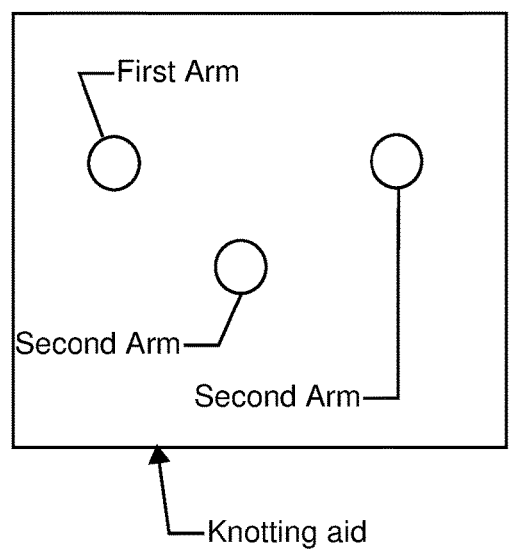
FIG. 16B illustrates an implementation of a knotting aid with more than one second arm.
Figure 16C:
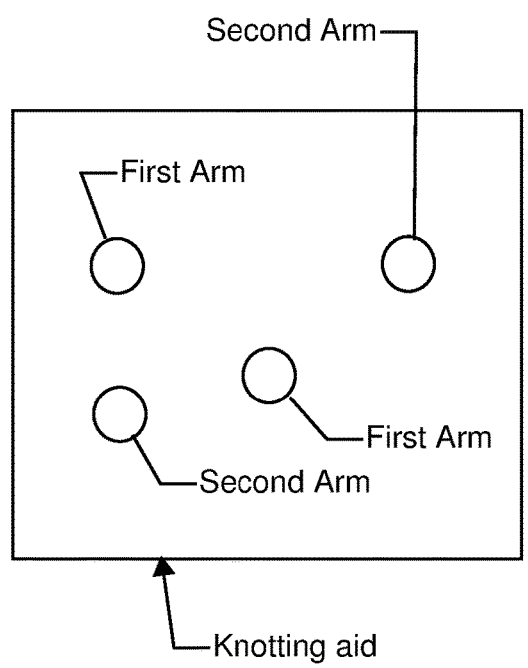
FIG. 16C illustrates an implementation of a knotting aid with more than one first arm and more than one second arm.

In some implementations, one or more of the components of the knotting aid 100 may be repositionable. For example, a sliding coupling member may be disposed over a slot in an arm to allow retention of a line disposed in the slot. In some implementations, one or more arms may be repositionable (see e.g., FIGS. 16A-C). For example, a base may include a plurality of recesses (e.g., a recess may be disposed at least partially through the base or through a base). A user may select the number of arms to utilize and/or the position of the arms based on the type of knot and/or number of lines to couple (see e.g., FIGS. 16A-C). In some implementations, the arms may be positioned to allow a predetermined distance to reside between arms. For example, a user with a larger hand may prefer a greater distance between arms to increase maneuverability between arms than a user with a smaller hand. In some implementations, the distance between the arms may be adjusted based on the type of knot (e.g., a specific knot may need a greater tension which may be obtained with smaller distance between arms, a specific knot may need a greater distance between arms to tie, etc.). By allowing flexibility in the distance between arms, a user satisfaction may increase. In some implementations, a first arm may be swapped for a third arm with a different coupling member (e.g., to accommodate a type of line, knot, user preference, etc.).

In some implementations, the knotting aid may include a kit. The kit may include a plurality of arms and a user may select the arms to be coupled to the base (e.g., based on the user, knot to be tied, number of lines, types of lines, etc.). The kit may include arms that are similar and/or different. For example, one or more arms may include different and/or similar types of coupling members (e.g., sliding coupling members and/or stationary coupling members). The arms may include coupling members positioned at different heights. The arms may include one or more slots. In some implementations, the arms may include replacement pieces.

In some implementations, the knotting aid may include a handle. The handle may facilitate gripping and/or transporting the knotting aid. FIG. 3 illustrates an implementations of an example portion 300 of the knotting aid. As illustrated, the knotting aid 300 includes a base 310. A handle 390 may be coupled to the base 310. In some implementations, a line cutter 395 may be positioned to rest in the handle 390. The handle may include a portion (e.g., opening, protrusion, recess, etc.) to inhibit accidental movement of scissors resting in the handle during use.

In some implementations, the knotting aid may include other features such as one or more lights (e.g., to facilitate knotting in early morning and/or night fishing), one or more batteries (e.g. to operate light(s), to power and/or recharge devices such as phones, fish finders, and/or GPS, to storage for fishing accessories, etc. For example, the knotting aid may include a bar that is adapted to couple with a reel to allow line to be wound on and/or unwound from the reel. The bar may include a first end that couples with the first arm (e.g., can be retained in a clamp of the first arm) and a second opposing end that couples with the second arm (e.g., disposed in the slot of the second arm. The bar may reside approximately horizontally between the arms when coupled to the arms of the knotting aid. A user may couple the bar to the reel (e.g., dispose the bar through an opening in the reel) and then couple the ends and/or regions proximate the ends of the bar. Then the user may wind or unwind line from the reel coupled to the fishing line. By utilizing the bar with the reel, lines may be wound more uniformly and/or kinks and/or bends in the line may be inhibited. In some implementations, the knotting aid may include a first bar adapted to couple to the first arm and a reel and a second bar that is adapted to couple to the second arm and a spool of line. At least a portion of the line may then be transferred between the reel and spool while secured to the knotting aid. This may allow line transfer while inhibiting damage to the line (e.g., bends) and/or increase the speed at which line may be transferred (e.g., since the reel and/or spool may be rotated to quickly transfer line between the two).

In some implementations, the width of the slot in the arm may be adjustable (e.g., to use with lines with greater diameters such as deep sea fishing lines or smaller diameters). For example, the slot may include a removable portion (e.g., u-shaped and/or v-shaped member that can be disposed and frictionally retained in the slot) that resides in the slot and creates a first width slot and when the removable portion is removed from the slot creates a second width slot that is greater than the first width. In some implementations, a top portion of the arm may be removable and replaced with a second top portion with a predetermined slot width. For example, the knotting aid may include a kit that includes several top portions and/or removable portions to allow a user to customize the slot width for a particular application.

In some implementations, the knotting aid may include adjustable arm(s). In some implementations, the height of the arm may be adjustable by using a coupling member that can be coupled to an arm at more than one height. FIG. 4A illustrates an implementation of an example knotting aid 100 and FIG. 4B illustrates an exploded view of the implementation of the example knotting aid illustrated in FIG. 4A. FIG. 5A illustrates an implementation of an example knotting aid 100 and FIG. 5B illustrates an exploded view of the implementation of the example knotting aid illustrated in FIG. 5A. The knotting aid 100 may include a base 110 with a first opening 111 and a second opening 112 capable of receiving arms 400, 450. The knotting aid includes an arm 400 that is capable of receiving more than one type of coupling member. As illustrated the arm 400 may be coupled to a clamp coupling member 410 and a height adjustable bait opening member 420. The arm 400 includes a receiving member 415 that includes a recess adapted to receive ends of the clamp coupling member 410 and/or the bait opening member 420. By utilizing a recess, the coupling member (e.g., the clamp and/or bait opening member) may be slid at least partially into the receiving member of the arm and disposed at a height. The user may adjust the height of the coupling member relative to the coupling member 440 on the second arm 450 by moving the coupling member 410, 420 up or down long a height of the recess in the receiving member. Thus, the height of the coupling members relative to each other may be adjusted. Allowing adjustment of the relative height of the coupling members on the arms and/or heights of the arms may facilitate accommodation of various fishing accessories (e.g., lures, hooks, etc.). For example, the height of the coupling member may be adjusted such that a line between the second arm and the first arm may be parallel or at another angle desired by a user.

In some implementations, the knotting aid may include feet 418. The feet may allow stabilization, be adjustable, may inhibit damage to surfaces, inhibit movement (e.g., resisting movement and/or by coupling to a surface such as by including suction cup feet, etc). For example, the feet may include rubber and/or a flexible plastic.

The base may include a cover 112 that is coupled to the base via a fastener 113. The fastener may be any appropriate fastener such as such as a hinge, as illustrated in FIG. 1D, and/or tabs, as illustrated in FIGS. 4B and 5B.

In some implementations, an organizer 119 may be disposed in the cavity of the base, as illustrated. The organizer may allow one or more components of the knotting aid and/or accessories thereof to be coupled to the organizer. The organizer may include retention members (e.g., protrusions, recesses, etc.) to couple with one or more components and/or accessories of the knotting aid.

In some implementations, the base of the knotting aid may serve as and/or supplement a tackle box. For example, the base may include a cavity that allows use as a tackle box and/or storage of components of the knotting aid. During use of the knotting aid, the arms of the knotting aid may couple to a top cover of the tackle box.

In some implementations the knotting aid may be coupled (e.g., removably and/or fixed) to a hard and/or soft sided tackle box. For example, the base may be formed in a wall (e.g., top and/or side) of the tackle box. The arms may be coupled to the base (e.g., in the wall of the tackle box), during use, such that when not in use, the arms do not interfere with carrying, access to the tackle box, etc. A tackle box includes walls that enclose a cavity, in which fishing accessories for example may be stored. A first wall (e.g., top wall and/or side wall) may include a flap. For example, the first wall may include an inner surface and/or cavity that is covered by the flap. In some implementations, zipper(s), Velcro, buttons and/or other fasteners may be used to open and/or close the flap. The cavity of the first wall may house the base and/or an organizer. The inner surface may include a platform that is at least partially rigid (e.g., plastic, metal, etc.) to provide stability to the base of the knotting aid. The base of the knotting aid may be disposed on the platform. The base may be coupled to the platform (e.g., snap fit, screwed, glued, etc.) and/or integrated with the platform. In some implementations, the cavity may be sized and/or shaped such that the base of the knotting aid may be tightly retained on the platform when the flap is closed (e.g., thus the base may be retained with or without coupling the base to the platform). For example, when the flap is closed, the size of the cavity may restrict movement of the base of the knotting aid. The flap may include two or more openings that align with opening(s) in the base of the knotting aid. Thus, the arms of the knotting aid may be coupled and/or uncoupled to the base through the openings in the flag. User convenience may be increased by allowing access to the base without opening the flap. In some implementations, the base may be coupled to and/or integrated with the platform in the first wall and the flap may be opened to allow access to the base. This may allow the base to be securely retained in the wall of the tackle box but may allow removal and/or replacement of the knotting aid (e.g., to a knotting aid with a base with a different arrangement and/or features). In some implementations, the flap may include opening(s) that allows access to features of the base (e.g., protrusions, sliding coupling member holders, etc.). The opening in the flap may allow access to one part or more than one part of the base (e.g., multiple openings and/or protrusions via one opening in the flap).

An organizer to hold arms, fishing accessories, coupling members, etc. may be disposed in a cavity (e.g., the same cavity and/or a different cavity) of the first wall. For example, the organizer may be disposed proximate a base coupled to the platform. The organizer may be disposed in a second cavity proximate the base such that a second flap may be opened to access the organizer. In some implementations, the second cavity may not include an organizer but include space for storage of knotting aid components such as arms.

Figure 6:
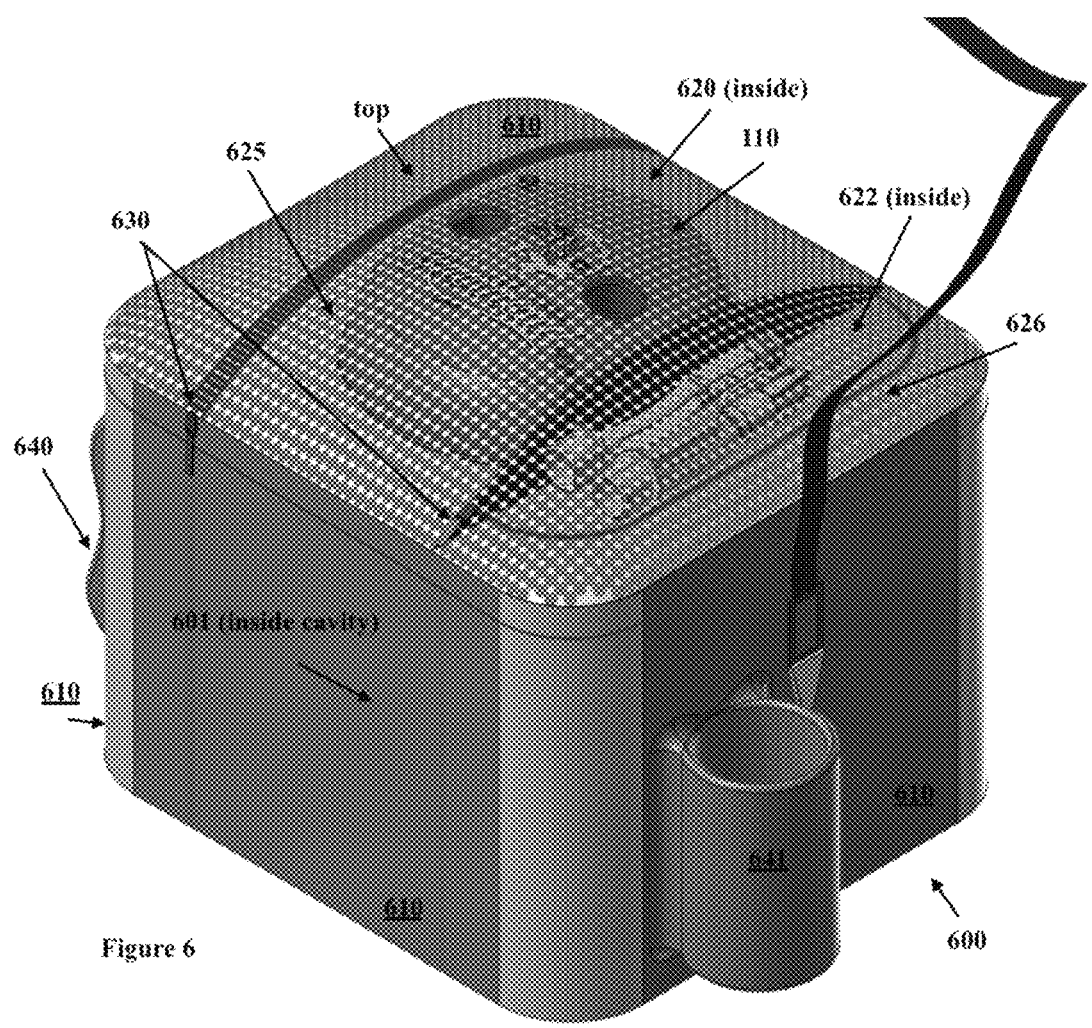
FIG. 6 illustrates an implementation of an example tackle box with a knotting aid.

FIG. 6 illustrates an implementation of an at least partially soft-sided tackle box 600. The tackle box 600 may include a main cavity 601 (e.g., for storage of fishing and nonfishing accessories) enclosed by walls 610 of the tackle box. The tackle box may include a wall that can be removed (e.g., cover, flap, etc.) to allow access to the main cavity 601. As illustrated in FIG. 6, a top wall of a tackle box may include at least two cavities 620, 622. Flaps 625, 626 may cover the first and second cavities. Fasteners 630 (e.g., zippers) may be used to gain and/or restrict access to the cavities. A platform 625 and a base 110 may be disposed in a first cavity. The first cavity may be sized such that when the first flap is fastened (e.g., closed), the base is retained in the first cavity without substantial additional room for movement (e.g., movement is restricted). Arms, coupling members, and/or other components of the knotting aid may be disposed in the second cavity. Thus, arms, coupling members, and/or other components of the knotting aid may be stored in the second cavity when not in use. By disposing the second cavity proximate the first cavity (e.g., on the same wall or on a different wall proximate the location of the first cavity), access to the components of the knotting aid may be facilitated. During use, two or more arms may be retrieved from the second cavity and coupled to the base via openings in the first flap. The tackle box may include other components such as carrying handles, exterior bags 640 and/or pockets 641, interior pockets, organizational members, etc.

FIG. 7 illustrates an implementation of a tackle box 700 with an integrated knotting aid. As illustrated, the base 110 of the knotting aid is integrated with a top wall of the tackle box 700. The base 110 may be integrated with side wall(s), in some implementations. The arms may be stored in the tackle box (e.g., in an organizer integrated in, coupled in, and/or disposed in the cavity of the tackle box such as inside the lid of the tackle box) coupled to the base 110 and coupled to the base as needed.

In some implementations, the arms may be capable of folding. An arm may be fixedly coupled to the base via a hinge. The hinge may allow the arm to rotate between at least a folded position and an upright position (e.g., the hinge may or may not allow the arm to be locked in intermediate positions). For example, a first end of an arm (e.g., first arm, second arm, additional arm) may include a hinge mechanism that couples the arm to the base. The arm may be folded to be approximately parallel to the base in the closed or folded position and may be upright (e.g., approximately perpendicular relative to the base) when unfolded or opened. The knotting aid may include a lock to maintain the position (e.g., open and/or closed) of the folding arm. As illustrated in FIG. 7, the arms may be folded down when not in use and unfolded and extended upright to facilitate knot tying. A flap may cover the arms when the arms are folded (e.g., to protect the arms, folding mechanism, and/or base). Utilizing a folding arm knotting aid may provide a compact knotting aid that facilitates transport.

In some implementations, the arms may couple with the base via openings in the base, and the arm may include a folding mechanism that allows the arm to fold above the coupling point with the base. For example, a first end of a folding arm may be inserted at least partially in an opening on the base of the knotting aid. The folding arm may have a hinge above the coupling point with the base such that the folding arm may be bent (e.g., folded) at the hinge and rotate the second end of the folding arm between at least a folded position (e.g., approximately parallel to the top surface of the base) and an unfolded position (e.g., upright and/or approximately perpendicular to a top surface of the base). The folding arm may be foldable to move an arm out of the way while securing lines to other arms, while knotting, and/or for any other appropriate purpose.

In some implementations, a folding arm may be a telescoping arm. For example at least a portion of the body of an arm may be capable of extending from a collapsed position and extending to one or more upright positions. The knotting aid may include locks that secure the position of the telescoping arm. Utilizing telescoping arms may facilitate storage and/or transport of the knotting aid.

In some implementations, the folding arm may be a ratcheting arm capable of extending between a collapsed position and one or more upright positions.

In some implementations, the ability of an arm to be positioned to more than one upright position may allow the arm height to be adjustable. Different or same heights may be selected by a user, for example, based on user preference and/or type of knot to be made.

In some implementations, a user may utilize nonfolding arms and folding arms separately and/or in combination with each other using the same base. For example, a user may select folding arms for some applications (e.g., use in tackle box, rough waters, etc.) and nonfolding arms for other applications.

Figure 1D:
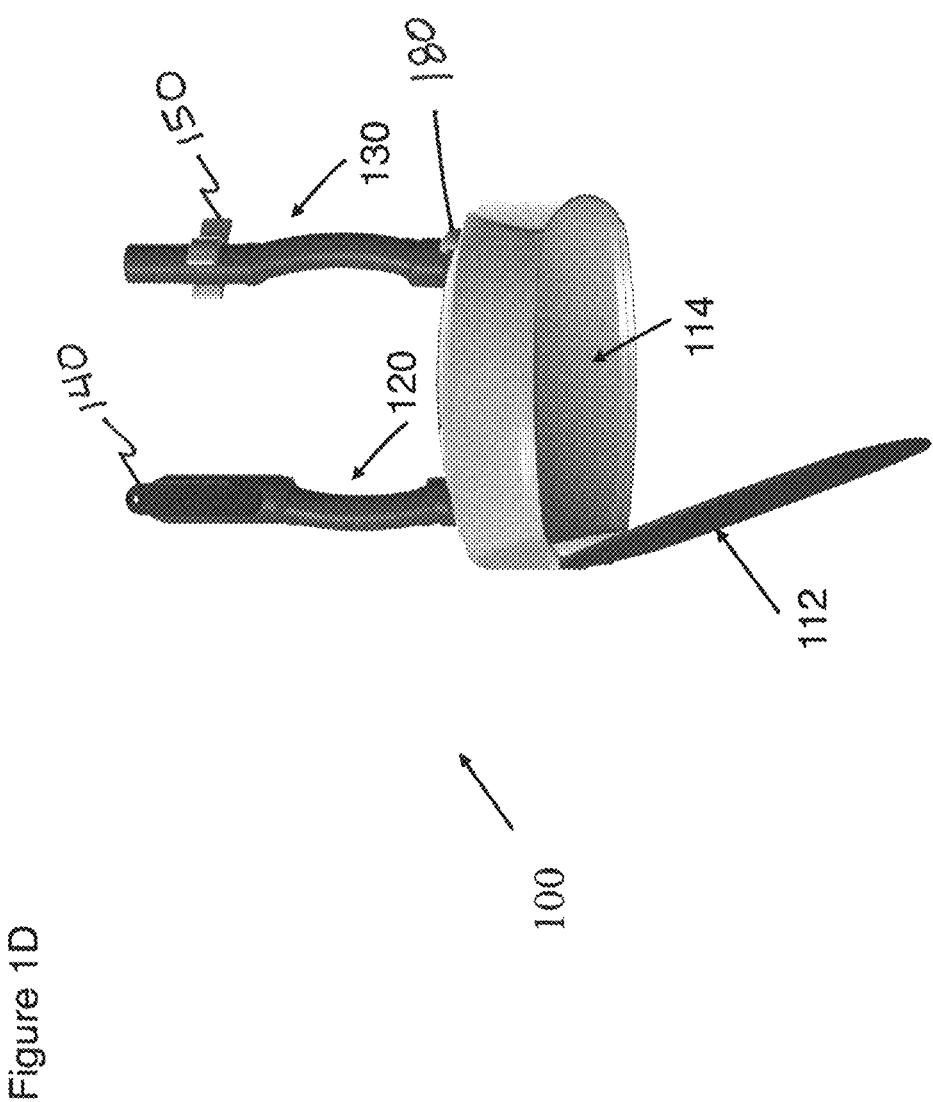
FIG. 1D illustrates a back perspective view of the implementation of the example knotting aid illustrated in FIG. 1A, with the cover opened.
Figure 1G:
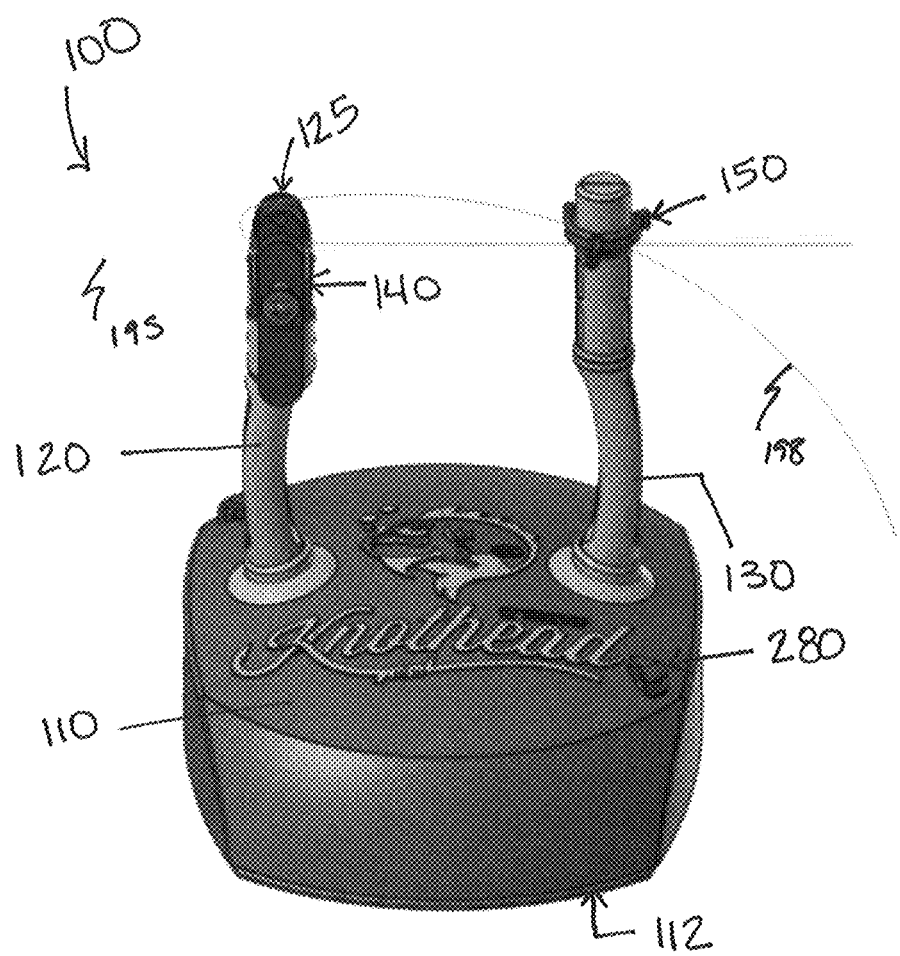
FIG. 1G illustrates an implementation of an example of lines coupled to the knotting aid illustrated in FIG. 1A.
Figure 1H:
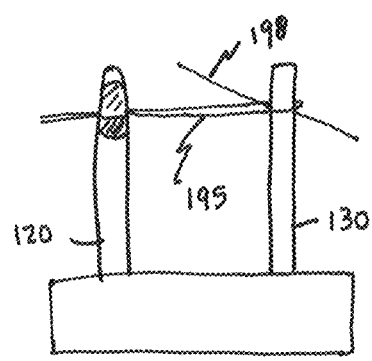
FIG. 1H illustrates an implementation of an example of lines coupled to the knotting aid illustrated in FIG. 1A.
Figure 1I:
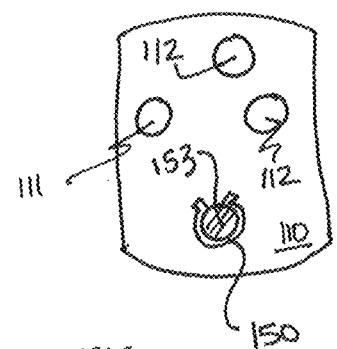
FIG. 1I illustrates a top view of an implementation of an example base of a knotting aid.

In some implementations, one or more folding arms may be coupled to a base of the knotting aid similar to FIG. 1A and/or with other versions of the base. In some implementations, the folding arms may be utilized with a tackle box similar to FIGS. 6 and/or 7. In some implementations, the knotting aid may include more than two arms and at least two of these arms may be folding arms. A user may unfold the arm(s) based on user preference, knot to be made, and/or any other appropriate reason.

Figure 15:
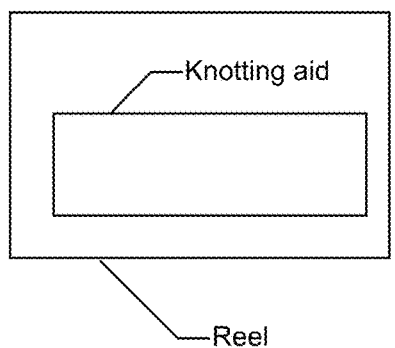
FIG. 15 illustrates an implementation of an example reel with a knotting aid.
Figure 14:
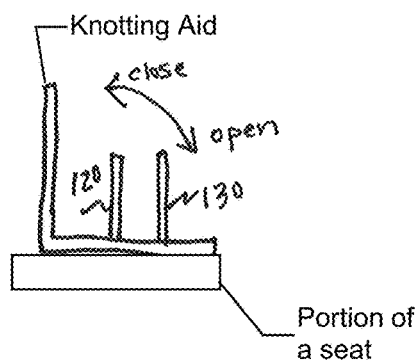
FIG. 14 illustrates an implementation of an example portion of a seat with a knotting aid.
Figure 12:
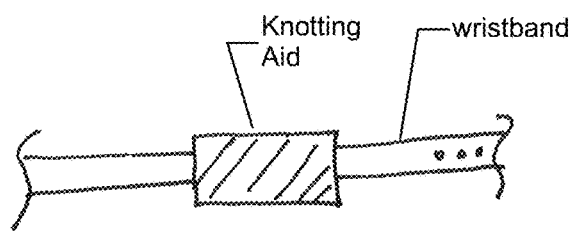
FIG. 12 illustrates an implementation of an example wristband with the knotting aid.

In some implementations, the knotting aid may be coupled to a portion of fishing rod and/or a portion of a reel (see e.g. FIG. 15).

Figure 8A:
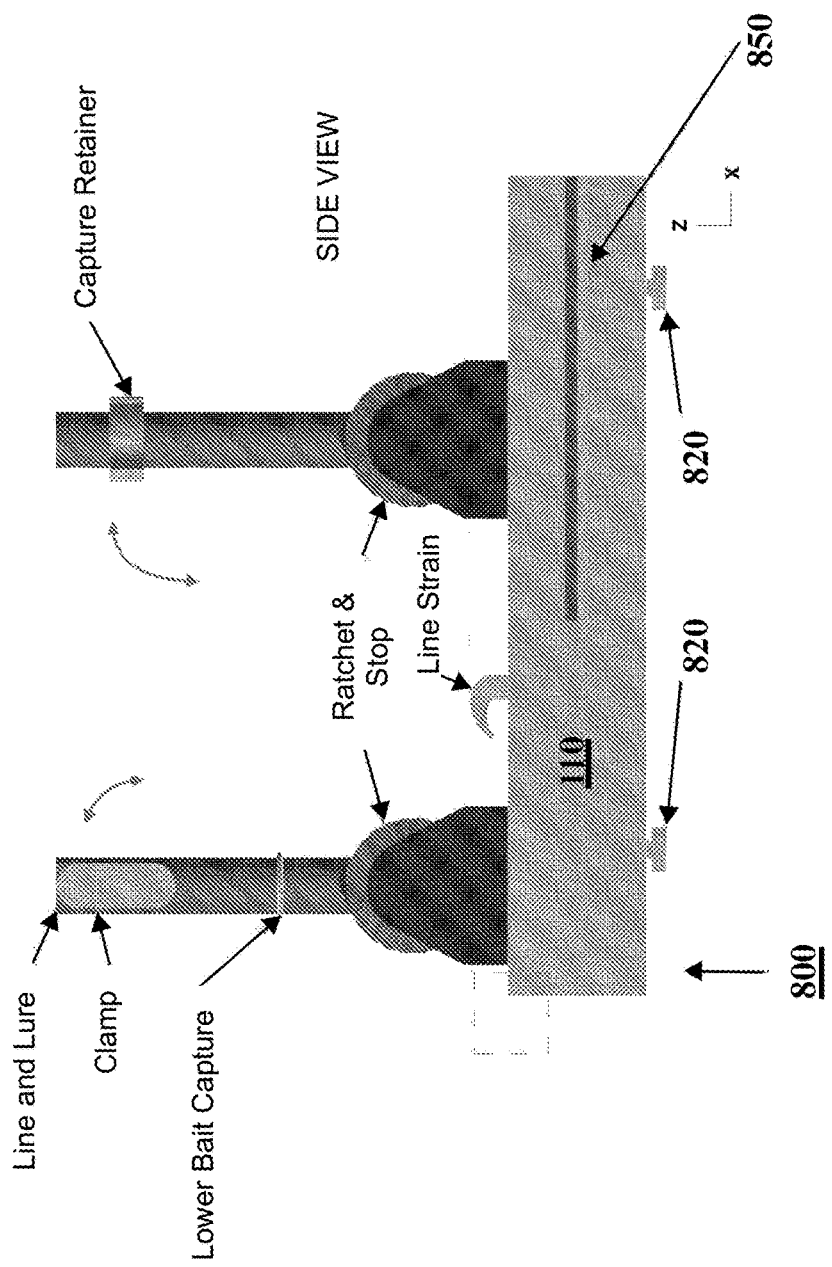
FIG. 8A illustrates an implementation of an example knotting aid for use on a kayak.
Figure 8B:
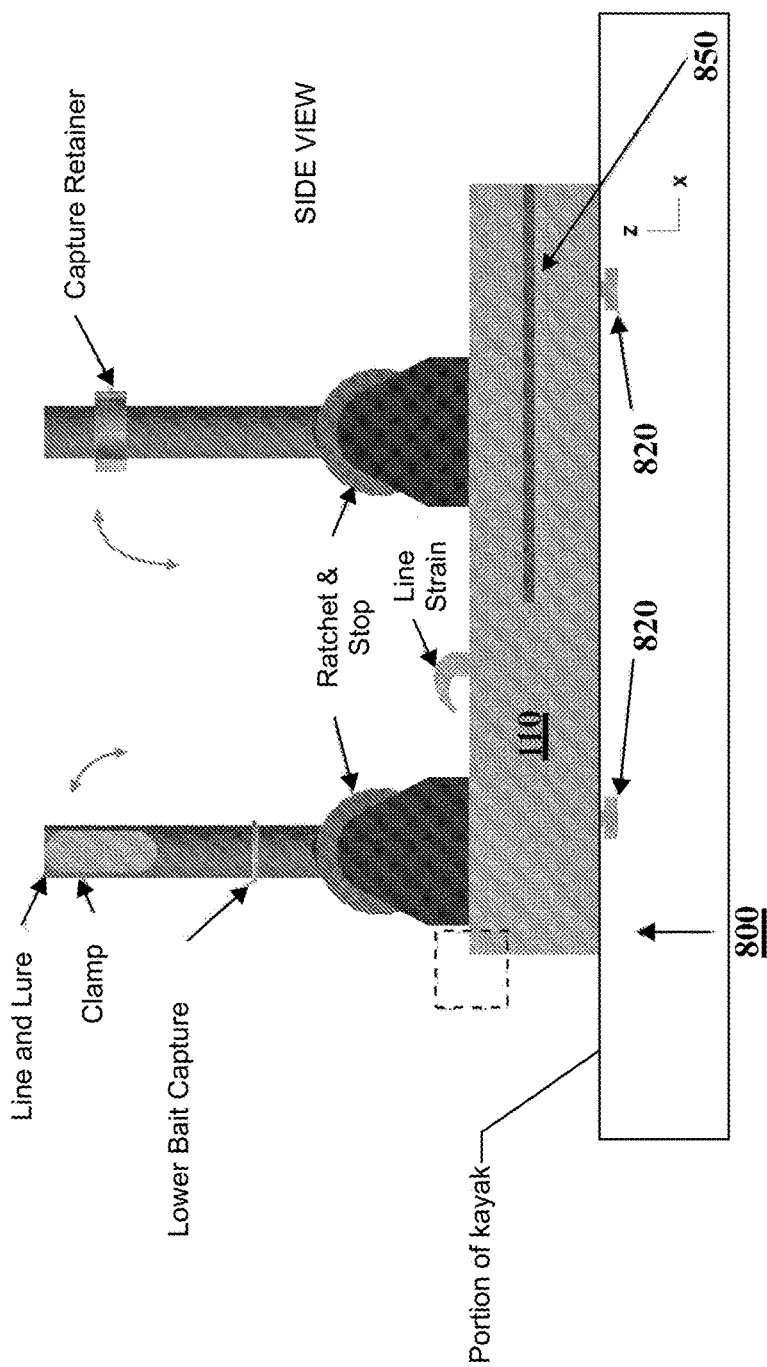
FIG. 8B illustrates an implementation of an example knotting aid on a kayak.

In some implementations, the knotting aid may be coupled to a portion of a vehicle, such as a boat (e.g., powered boats, sail boats, and/or unpowered boats such as kayaks). FIGS. 8A and 8B illustrates an implementation of an example knotting aid 800 for use on a kayak. The knotting aid 800 may include mounts 820 on the base 110 of the knotting aid (e.g., on a bottom surface of the base, on a side surface of the base, etc.). The mount may include any appropriate mount capable of mounting the knotting aid to a vehicle. For example, boat mounts, such as RAM mounts, may be utilized. The mount may couple the base to the vehicle (e.g., kayak). The knotting aid may include a tool sharpener 850. The knotting aid may include accessible storage (e.g., pull out drawer with or without organizer, cavity in the base), in some implementations. The knotting aid may include foldable and/or nonfoldable arms. In some implementations, foldable arms may be utilized with the base 110 to facilitate use on a small vessel, such as a kayak.

Figure 9A:
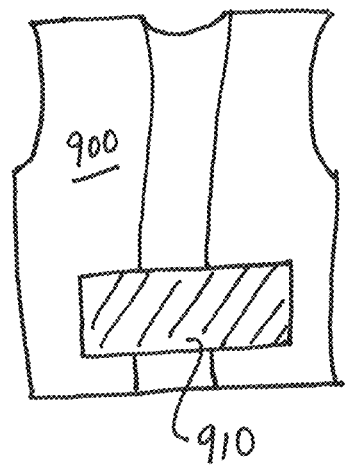
FIG. 9A illustrates an implementation of an example article of clothing with a knotting aid.
Figure 9B:
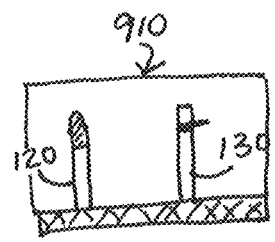
FIG. 9B illustrates a front view of an implementation of the example knotting aid illustrated in FIG. 9A.
Figure 9C:
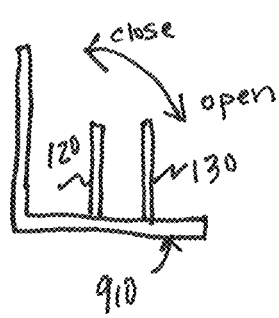
FIG. 9C illustrates a side view of an implementation of the example knotting aid illustrated in FIG. 9A.
Figure 9D:
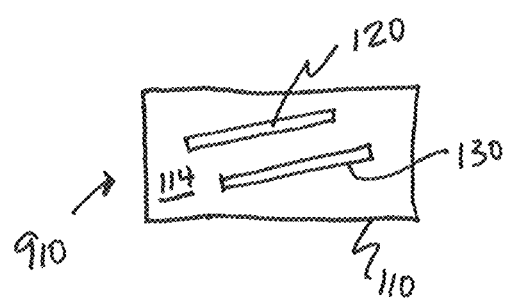
FIG. 9D illustrates a bottom view of an implementation of the example knotting aid illustrated in FIG. 9A.

In some implementations, the knotting aid may be coupled to and/or integrated with clothing and/or wearable accessories. The knotting aid may be coupled to and/or coupleable to vests, shirts, jackets, etc. For example, FIGS. 9A-9D illustrate views of an implementation of an example article of clothing with a knotting aid. The illustrated vest 900 includes a knotting aid 910 coupled to a front portion of the vest. The knotting aid may be removable, as shown, to facilitate putting the article of clothing on and off, and/or disposed on the article of clothing in a position to not substantially interfere with putting the article of clothing on and off (e.g., on a sleeve of the article of clothing). The knotting aid may be positioned to facilitate use of the knotting aid while wearing the article of clothing. The knotting aid may include foldable arms to facilitate quick opening and closing of the knotting aid. As illustrated, the knotting aid may include a cover to be disposed over a top surface of the base when the knotting aid is closed. The cover and the base may be coupled via a hinge that allows rotation of the base relative to the cover. The hinge may restrict movement, such as restricting rotation of the base to, for example, an angle greater than approximately perpendicular to the cover. When the knotting aid is opened, the base may rotate to an open position (e.g., as illustrated in FIG. 9B. The arms may automatically self-align to an upright position and/or may be unfolded to an upright position. A user may then couple line(s) and/or fishing accessories to tie knot(s). The knotting aid may be closed after use. The arms may be folded and the base may be rotated to contact the cover and close the knotting aid. In some implementations, the arms may self-fold as the base is rotated to contact the cover and close the knotting aid. The knotting aid may include a latch and/or other appropriate type of lock that secures the coupling of the cover with the base in the closed position. In some implementations, the base may include a storage portion (e.g., in a cavity of the base with or without a second cover on the bottom portion of the base). Arms and/or fishing accessories may be stored in the storage portion of the base. In some implementations, the knotting may include one or more nonfolding arms (e.g., in addition to and/or in place of one or more of the folding arms). To utilize the knotting aid, the arms may be removed from the storage portion of the base and the knotting aid may be opened (e.g., the base may be rotated from a closed position to an open position). The arms may then be coupled to the base (e.g., via openings in the base), and a user may utilize the knotting aid. When the user desires to close the knotting aid, the arm may be removed from the base, the base may be rotated to the closed position, and the arms may be stored in the storage portion of the base.

Figure 10:
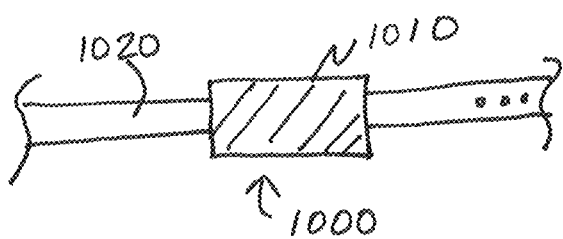
FIG. 10 illustrates an implementation of an example belt with the knotting aid.

In some implementations, the knotting aid may be coupled to and/or integrated with wearable accessories such as watches, straps (e.g., wearable, on bags, etc.), and/or belts. For example, the base of the knotting aid may include one or more couplers such as loops (e.g., flexible and/or rigid), and a strap (e.g., of a watch, strap, and/or belt) may pass through the loop(s) to couple the strap and the knotting aid. The couplers on the base may include other appropriate couplers such as hooks (e.g., such that the knotting aid can be removed without removing the strap from a portion of the body), buttons (e.g., to be received in holes in a belt or other strap), quick connectors (e.g., to allow quick release and connection), and/or any other appropriate coupler. FIG. 10 illustrates an implementation of an example belt 1000 with the knotting aid 1010 coupled to a strap 1020 of the belt. In some implementations, a user may utilize the knotting aid while on the strap and/or a user may remove the knotting aid from the strap prior to use.

Figure 11:
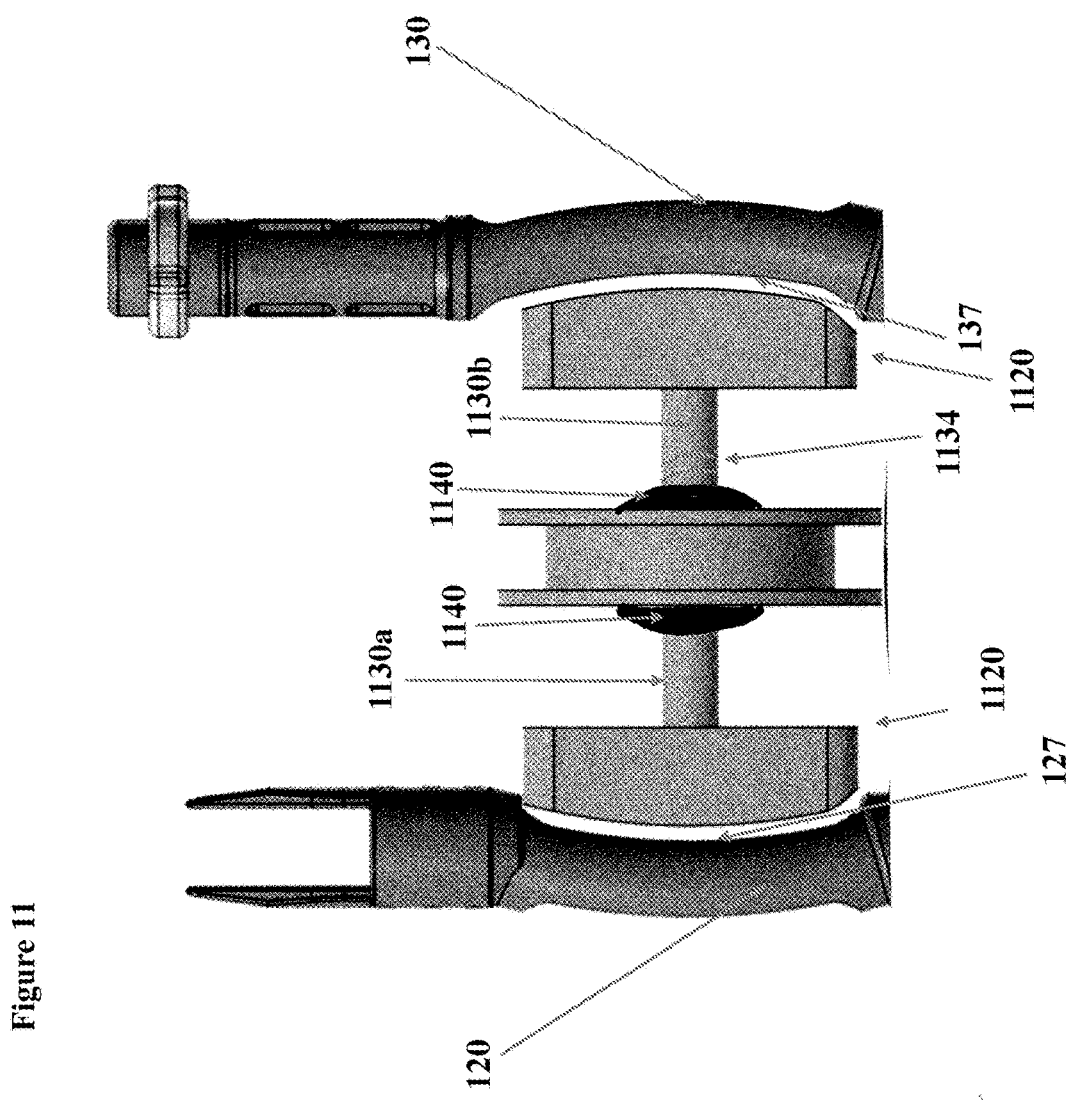
FIG. 11 illustrates an implementation of an example of a knotting aid with a line spool holder.
Figure 13:
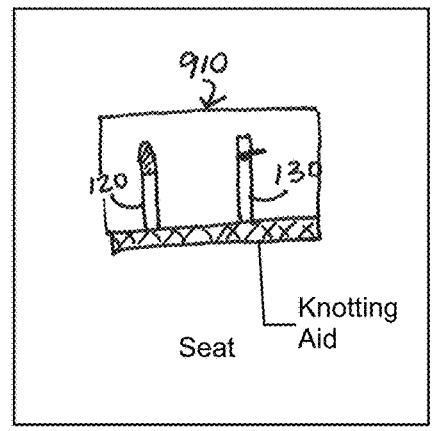
FIG. 13 illustrates an implementation of an example seat with a knotting aid.

In some implementations, a line spool may be coupled to the knotting aid. A spool holder may be coupled at one end to the first arm and at a second opposing end to the second arm of the knotting aid. The spool holder may retain a spool (e.g., with line wound on the spool) between at least two arm of the knotting aid. The spool holder may couple with a spool to allow rotation of the spool in some implementations (e.g., by including a post that passes through an opening in the center of the spool). FIG. 11 illustrates an implementation of an example of a portion of a knotting aid with a spool holder 1110. As illustrated, the knotting aid includes at least two arms 120, 130. The body of the arms 120, 130 may include cavities 127, 137, as illustrated in FIGS. 1A and 5A. The spool holder may include brace members 1120 that are positionable at least partially in the cavities 127, 137 to couple the spool holder to the knotting aid. In some implementations, the brace members may contact two or more of the arms of the knotting aid to couple the spool holder to the knotting aid. The brace members may be coupled to each other via at least one post 1130. The post may include a compressible portion 1132 (e.g., via an internal spring, external spring, etc.). Force may be applied to the brace members and/or post to dispose and/or remove the spool holder between arms. The arms may exert a force on the compressible portion of the spool holder to maintain the position of the spool holder between the arms, in some implementations. In some implementations, the post may include more than one post member. As illustrated in FIG. 11, the post 1130 may include a first post member 1130a and a second post member 1130b. The first post member 1130a may include a compressible portion 1132 and the second post member 1130b may be adjustable in length. As illustrated, the second post member may include a threaded portion 1134 that allows the length of the second portion to be adjusted (e.g., by rotating the second post member into a spool nut 1140). The use of a two or more post member post 1130 may allow the position of the spool between the arms of the knotting aid to be adjusted and/or selected. For example, the user may prefer that a spool be proximate a side and/or center of the knotting aid (e.g., to facilitate coupling the lines to the knotting aid and/or hand tying knots). The first and/or second post members may be coupled to a spool nut 1140 (e.g., non adjustable and/or adjustable). The compressible portion of the first post member may be compressed to position the spool holder between arms of the knotting aid. The position of a spool held between spool nuts 1140 of the spool holder 1110 may be adjusted by adjusting the length of the second post member 1130b (e.g., by screwing the second coupling member further into and/or out of the spool nut). The line on the spool coupled via the spool line may be pulled through and/or coupled to the arm(s) of the knotting aid to be knotted to another line and/or fishing accessory (e.g., bait, lure, hook, weight, etc.). Utilizing the spool holder may inhibit tangling and/or twisting of a primary line and/or secondary line. The spool may be coupled to the knotting aid to knot the line on the spool to, for example, other line(s) and/or fishing accessories, and then removed from the knotting aid after the knot(s) have been tied. The spool may then be transferred to a reel. In some implementations, the spool holder may hold the secondary line and used to tie knots to a primary line (e.g., on a reel). The spool holder may hold more than one spool in some implementations (e.g., using a post that can hold multiple spools and/or stacking spool holders along a length of an arm).

In some implementations, the knotting aid may have a size (e.g., when collapsed and components stored in the base) to allow carrying in pockets or disposing in compartments of a tackle box.

In some implementations, the knotting aid may include rust and/or mold inhibiting materials and/or coatings. The knotting aid may include material(s) resistant to impact and/or shattering, in some implementations.

The knotting aid may include a sharpening tool (e.g., for hooks and/or blades). For example, the base may include (e.g., coupled to the base and/or integrated with the base) a sharpening tool capable of sharpening a metal object, such as a hook and/or knife blade. The sharpening tool may be a flat member and/or include grooves to facilitate sharpening. The sharpening tool may be include any appropriate material for sharpening, such as metals (e.g., metals, alloys, etc.), stone (e.g., synthetic and/or natural stones such as Arkansas sharpening stones) and/or coatings (e.g., diamond coatings).

In some implementations, the knotting aid may include two arms that are couplable to the base. A first arm may include a clamp and a second arm may include a sliding coupling member, such as a c-clamp, in some implementations. The knotting aid may include more than two arm (e.g., additional first arms, second arms, and/or other arms). First arm(s) and/or second arm(s) may include additional coupling members (e.g., clamps, slots, c-clamps, etc.). The base may be adapted to receive two or more arms. The receiving members of the base (e.g., openings in the base and/or protrusions on the base) may be disposed in different locations to allow the arms to be couple to the base to facilitate knotting line(s) and/or objects coupled to the knotting aid. The base may include a base similar to FIG. 1A, 5A, and/or other described bases. The base may be a portion of an object such as a tacklebox, bag, box, vehicle (e.g., powered boat, kayak, etc.), belt, vest, coat, wearable accessory, etc. The base may couple to an object such as a tacklebox, bag, box, vehicle (e.g., powered boat, kayak, etc.), belt, vest, coat, wearable accessory, etc. The base may or may not allow storage of one or more of the components of the knotting aid in and/or on the base.

The described processes may be implemented by various systems, such as system 100. In addition, various operations may be added, deleted, and/or modified. For example, an arm may include one or more different types of coupling members. In some implementations, each arm may be similar but different coupling members may be utilized to create a knot (e.g., a clamp on one arm and a sliding c-shaped clamp on another arm may be utilized to create a knot). In some implementations, one or more of the described processes may be performed in combination with other processes. For example, the knotting aid may be utilized to couple a hook to a line and then couple one or more secondary lines to line with the hook.

Although various implementations have described a first line being wrapped at least partially around at least one of the arms, the knotting aid may be utilized in different ways to facilitate any type of tying (e.g., by hand or automated). For example, a first line may be disposed in a first slot in a first arm and at least one second line may be disposed in a second slot in a second arm and/or coupled to the second arm via a clamp. The two lines may be coupled then via a knot (e.g., hand tied by a user).

In some implementations, the first line may be coupled to the first arm via a slot and pass through a slot in the second arm. The first line may be coupled to the second arm via a sliding coupling member. At least one second line may be disposed in the second slot, coupled to the second arm via a sliding coupling member, and/or coupled to the first arm. The first line may then be coupled to at least one of the second lines. In some implementations, the second line may be free (e.g., not coupled to the first and/or second arm or disposed in a slot in the first and/or second arm) and coupled to the first line.

Although specific orientations of the arms, coupling members, and/or slots have been described, other orientations may be utilized as appropriate. For example, a slot may be disposed on the first art in addition to the second arm. In some implementations, a clamp may be disposed on the second arm in addition to a sliding coupling member.

In some implementations, the arms of the knotting aid may not be removably coupled. The arms may be fixed to the base of the knotting aid in some implementations.

Although various implementations have described a slot in a second arm, slot(s) may be disposed on other arms (e.g., first arm, third arm, etc.). The slot may be disposed in an end of the arm (e.g., second end) and/or a side of an arm. For example, a slot may be a recess cut into an arm that allows a line to be disposed in the slot. In some implementations, the position of the slot may facilitate line knotting.

Although users have been described as a human, a user may be a person, a group of people.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a knot" includes a combination of two or more knots and reference to "a line" includes different types and/or combinations of lines.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A fishing knotting aid comprising:
 a base, wherein the base comprises:
  one or more first openings dispose at least partially through the base;
  one or more second openings disposed at least partially through the base;
  a cavity disposed in the base; and
  a removable cover disposed over the cavity:
 one or more first arms, wherein each of the first arms comprises:
  a first end; and
  a second end capable of being at least partially received in at least one of the first openings of the base;
 one or more second arms, wherein each of the second arms comprises:
  a first end, wherein the first end comprises a slot, wherein the slot is capable of receiving one or more fishing lines; and
  a second end capable of being at least partially received in at least one of the second openings of the base;
 one or more first coupling members disposed on at least one of the first arms, wherein each of the first coupling members is capable of securing one or more of the fishing lines to the first arm, and wherein each of the first coupling members comprises a clamp; and
 one or more second coupling members disposed on at least one of the second arms, wherein each of the second coupling members is capable of securing one or more of the fishing lines to the second arm, and wherein each of the second coupling member comprises a sliding coupling member;
 wherein the fishing knotting aid is capable of coupling with one or more of the fishing lines via at least one of the first coupling member and at least one of the second coupling member to allow a user to tie at least one knot in one or more of the fishing lines.

2. The fishing knotting aid of claim 1 further comprising a spool holder coupleable to at least one of the first arms and at least one of the second arms, wherein the spool holder comprises at least one of the primary line or the secondary line.

3. The fishing knotting aid of claim 1 wherein the base comprises one or more curved protrusions capable of coupling with fishing accessories.

4. The fishing knotting aid of claim 1 wherein the cavity of the base is adapted to allow storage of one or more of the first arms, one or more of the second arms, one or more of the first coupling members, and one or more of the second coupling members.

5. The fishing knotting aid of claim 1 wherein at least one of the first coupling members is disposed proximate the first end of the first arm, and at least one of the second coupling members is disposed proximate the first end of the second arm.

6. The fishing knotting aid of claim 1 wherein the base comprises at least one sliding coupling member holder.

7. The fishing knotting aid of claim 1 wherein at least one of the second coupling members is disposed proximate the first end of the second arm, and wherein at least one third coupling member is disposed on the second arm.

8. The fishing knotting aid of claim 1 wherein the base comprises at least one of:
 a portion of a belt,
 a portion of a boat,
 a portion of a wrist band,
 a portion of a strap,
 a portion of an article of clothing,
 a portion of a seat,
 a portion of a reel,
 a portion of a tackle box,
 or a storage compartment.

9. A knotting aid comprising:
 one or more first arms, wherein each of the first arms comprises:
  a first end; and
  a second end capable of coupling with a base;
 one or more second arms, wherein each of the second arms comprises:
  a first end, wherein the first end comprises a slot, wherein the slot is capable of receiving one or more fishing lines; and
  a second end capable of coupling with the base;
 one or more first coupling member disposed on at least one of the first arms, wherein each of the first coupling members is capable of securing one or more of the fishing lines to the first arm, and wherein each of the first coupling members comprises a stationary coupling member, and wherein at least one of the stationary coupling members comprises a clamp; and one or more second coupling members disposed on at least one of the second arms, wherein each of the second coupling members is capable of securing one or more of the fishing lines to the second arm, and wherein each of the second coupling member comprises a sliding coupling member;

wherein the knot tying aid is capable of coupling with one or more of the fishing lines via at least one of the first coupling member and at least one of the second coupling member to allow a user to tie at least one knot in one or more of the fishing lines.

10. The knotting aid of claim 9 wherein the second end of the first arm is at least partially received in at least one first opening of the base, and wherein the second end of the second arm is at least partially received in at least one second opening of the base.

11. The knotting aid of claim 9 wherein the base comprises one or more protrusions capable of coupling with at least one of the first arm or the second arm, wherein a protrusion may be disposed in a recess in at least one of the second end of the first arm or the second end of the second arm.

12. The knotting aid of claim 9 wherein the knot tying aid comprises a bait opening disposed on at least one of: one of the first arms or one of the second arms; and wherein the bait opening is configured such that when an end of one of the first fishing lines is drawn through the bait opening, the bait opening inhibits passage of bait coupled to the first fishing line.

13. The knotting aid of claim 9 wherein the knot tying aid includes at least one of:
two or more first arms coupled to the base;
or two or more second arms coupled to the base.

14. The knotting aid of claim 9 wherein the width of the slot is adjustable.

15. The knotting aid of claim 9 wherein one or more of the first arms is a foldable arm and one or more of the second arms is a foldable arm.

16. A method of tying a knot in one or more fishing lines, the method comprising:
positioning at least first portion of the first fishing line in a slot in a first second arm of a fishing knotting aid, wherein the slot comprises a free end;
wrapping a second portion of the first fishing line at least partially around the second arm of a fishing knotting aid, wherein the second portion is proximate the first portion of the first fishing line, and wherein the second arm is coupled to a base of the fishing knotting aid;
coupling at least two third portions of the first line to a first coupling member of the fishing knotting aid, wherein the at least one of the third portions extends from the first portion of the first fishing line and at least one of the third portions extends from the second portion of the first fishing line, wherein the first coupling member comprises a stationary coupling member; and wherein the first coupling member is coupled to a first arm of a base of the fishing knotting aid;
positioning a second fishing line through the slot disposed in a first end of the second arm of the fishing knotting aid;
sliding a second coupling member on the second arm of the fishing knotting aid to inhibit the first fishing line and the second fishing line from passing through the free end of the slot;
coupling the first fishing line and the second fishing line via at least one knot formed by a user;
uncoupling the first fishing line and the second fishing line from the second arm by removing the first coupling member; and
uncoupling the first fishing line and the second fishing line from the first arm.

17. The method of claim 16 further comprising:
coupling one or more additional lines to the fishing knotting aid; and
coupling at least one of the additional lines to at least one of the first fishing line or the second fishing line.

18. The method of claim 16 further comprising:
coupling one or more fishing accessories to the fishing knotting aid; and
coupling one or more of the coupled fishing accessories to at least one of the first fishing line or the second fishing line.

19. The fishing knotting aid of claim 1 wherein the cavity of the base is capable of being used as a tackle box.

20. The knotting aid of claim 9 wherein the base comprises at least a portion of a tackle box or wherein the knotting aid is capable of being coupled to the tackle box.

21. The method of claim 16 further comprising:
unfolding the second arm prior to positioning the at least first portion of the first fishing line in the slot in the second arm; and
unfolding the first arm prior to coupling the at least two third portions of the first line to the first coupling member of the first arm.

* * * * *